US009967473B2

(12) United States Patent
Takahashi

(10) Patent No.: US 9,967,473 B2
(45) Date of Patent: May 8, 2018

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventor: Fumiaki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/501,164

(22) PCT Filed: Jul. 31, 2015

(86) PCT No.: PCT/JP2015/003877
§ 371 (c)(1),
(2) Date: Feb. 1, 2017

(87) PCT Pub. No.: WO2016/021168
PCT Pub. Date: Feb. 11, 2016

(65) Prior Publication Data
US 2017/0230586 A1    Aug. 10, 2017

(30) Foreign Application Priority Data

Aug. 4, 2014  (JP) ................................ 2014-158779
Jul. 17, 2015  (JP) ................................ 2015-143387

(51) Int. Cl.
*H04N 5/232*  (2006.01)
*G06F 3/0481*  (2013.01)
(Continued)

(52) U.S. Cl.
CPC ......... *H04N 5/262* (2013.01); *H04N 5/23293* (2013.01)

(58) Field of Classification Search
CPC .......... H04N 5/23216; H04N 5/23293; H04N 1/00408–1/00437; H04N 1/32122; G06F 3/048–3/04897
See application file for complete search history.

(56) References Cited

U.S. PATENT DOCUMENTS

2008/0002035 A1   1/2008  Yoshida
2009/0290042 A1  11/2009  Shiohara

FOREIGN PATENT DOCUMENTS

JP    2009303122 A   12/2009
JP    2010183351 A    8/2010
(Continued)

*Primary Examiner* — Paul Berardesca
(74) *Attorney, Agent, or Firm* — Canon U.S.A., Inc. IP Division

(57) ABSTRACT

The present invention relates to appropriate notification of whether an adjustment item in image processing is available to a user when an information processing apparatus separately acquires a first image and a second image paired with the first image.
The information processing apparatus displays the adjustment item in the image processing on a screen in order to set a parameter of each adjustment item for a sub image. The information processing apparatus performs an acquisition process to acquire a main image paired with the sub image. Among the multiple adjustment items displayed on the screen, adjustment items achieving only insufficient adjustment results with the sub image and main image adjustment items achieving more appropriate adjustment results with the main image are updated to a display mode corresponding to an acquisition status of the main image to display the adjustment items on the screen in the updated display mode.

17 Claims, 17 Drawing Sheets

(51) Int. Cl.
*G06F 3/14* (2006.01)
*H04N 5/262* (2006.01)

(56) References Cited

FOREIGN PATENT DOCUMENTS

| JP | 2011010090 A | 1/2011 |
|---|---|---|
| JP | 2012129611 A | 7/2012 |

[Fig. 1]
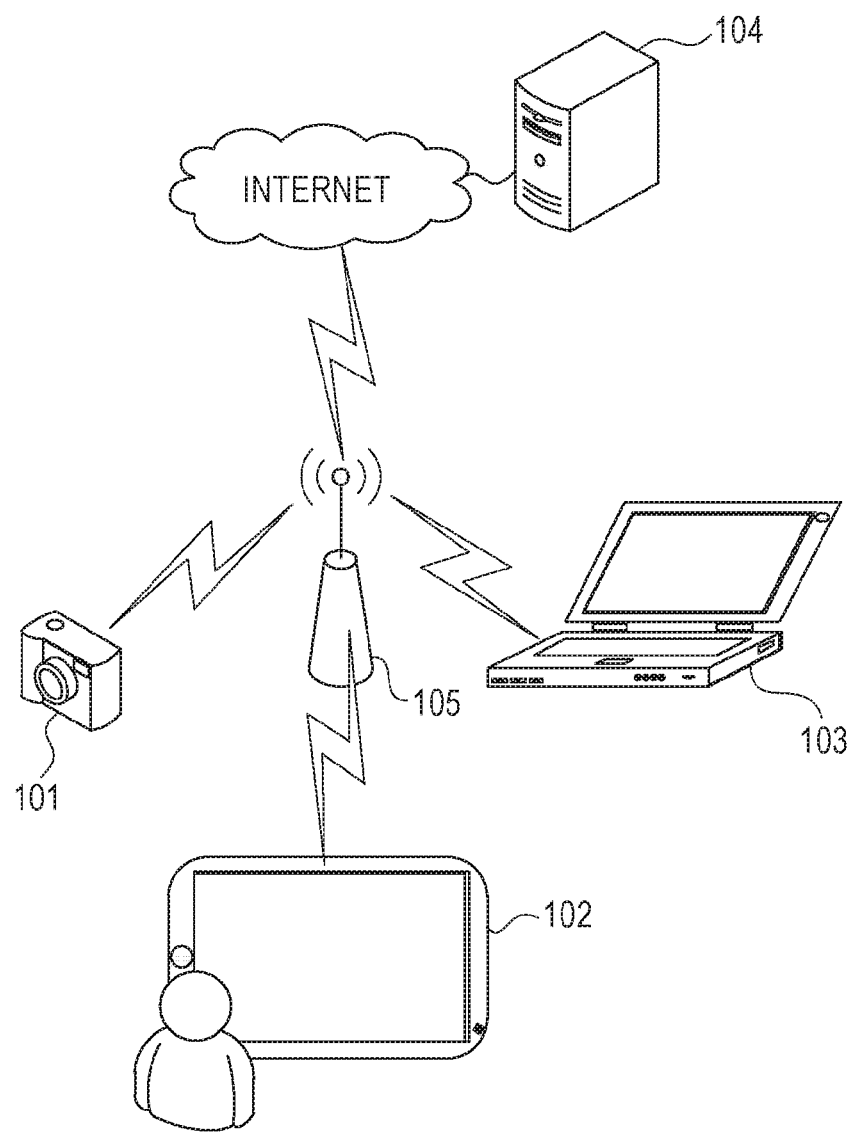

[Fig. 2]
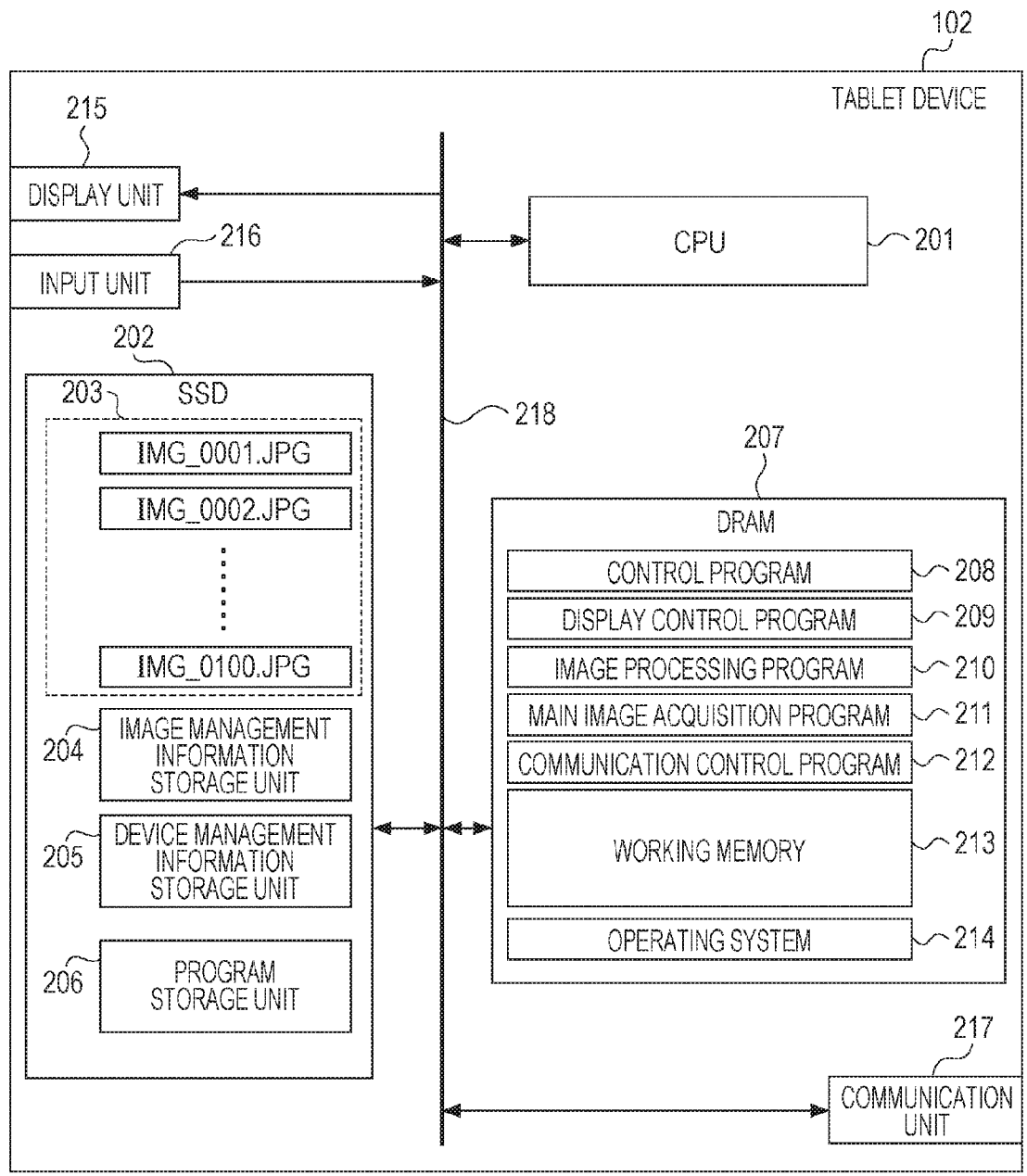

[Fig. 3]
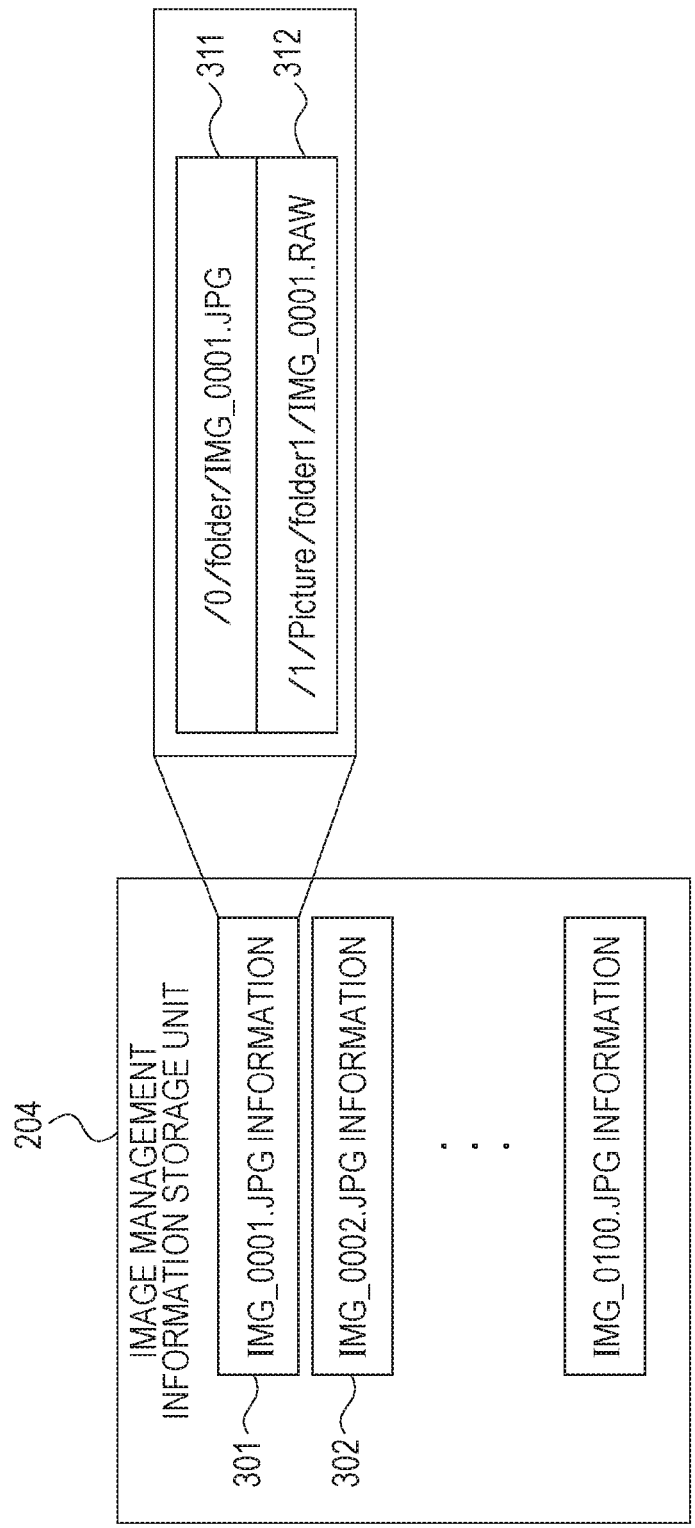

[Fig. 4]
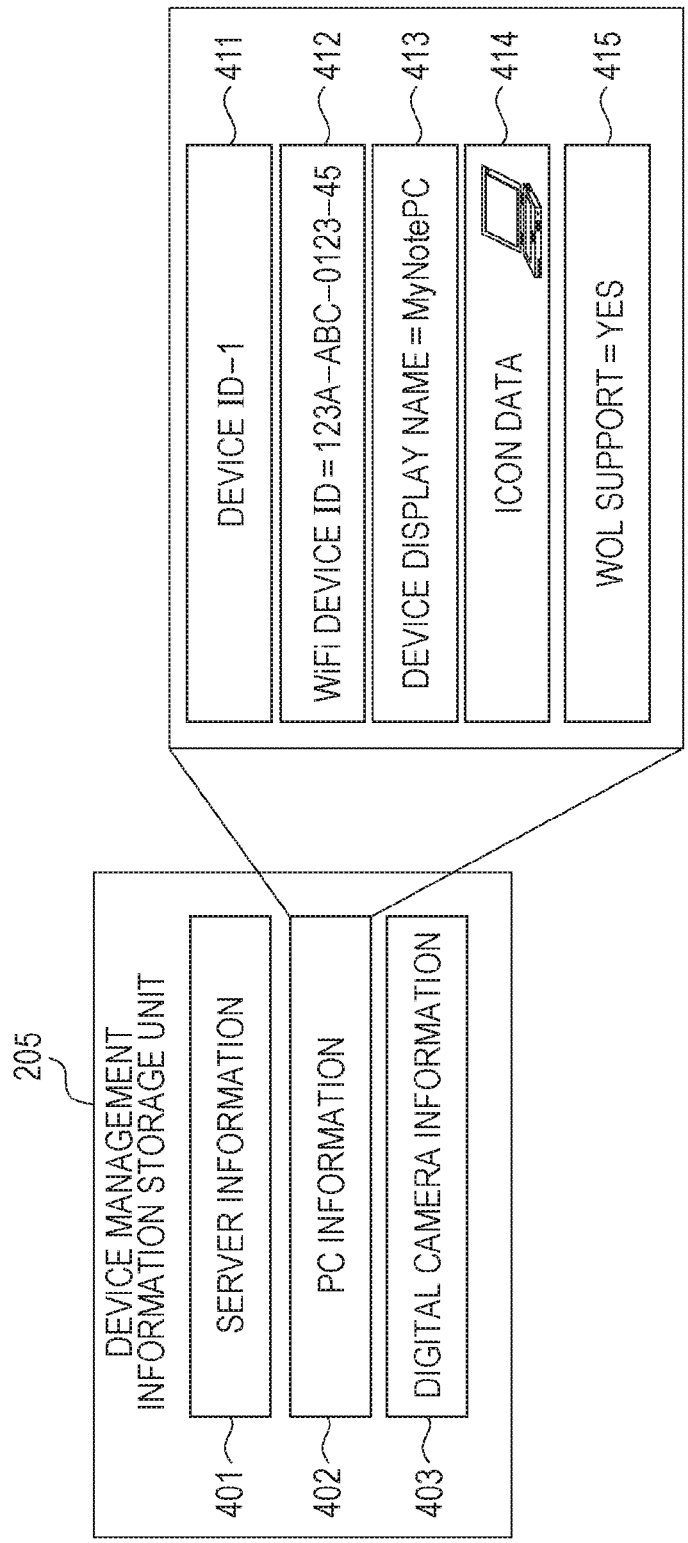

[Fig. 5]
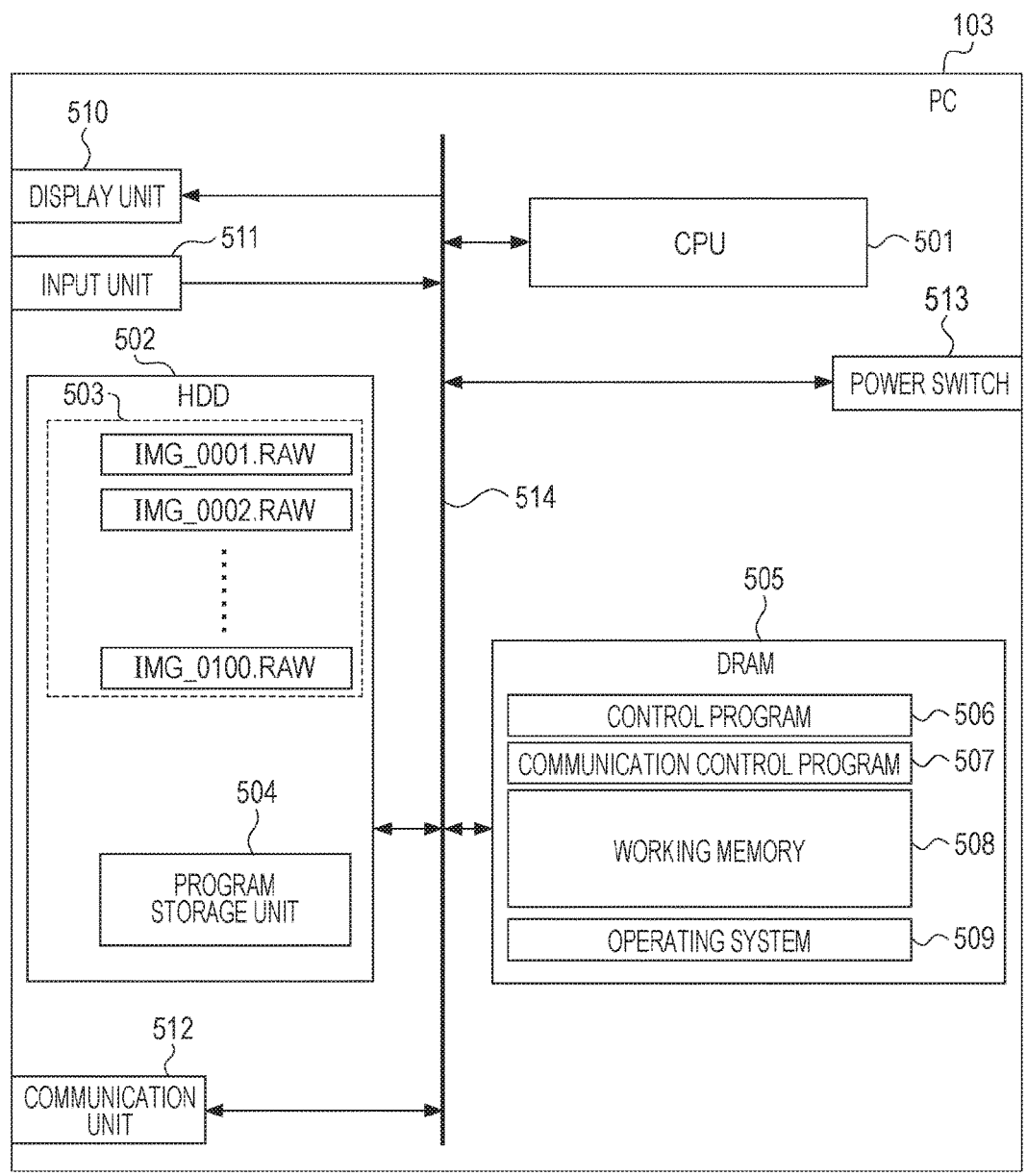

[Fig. 6]
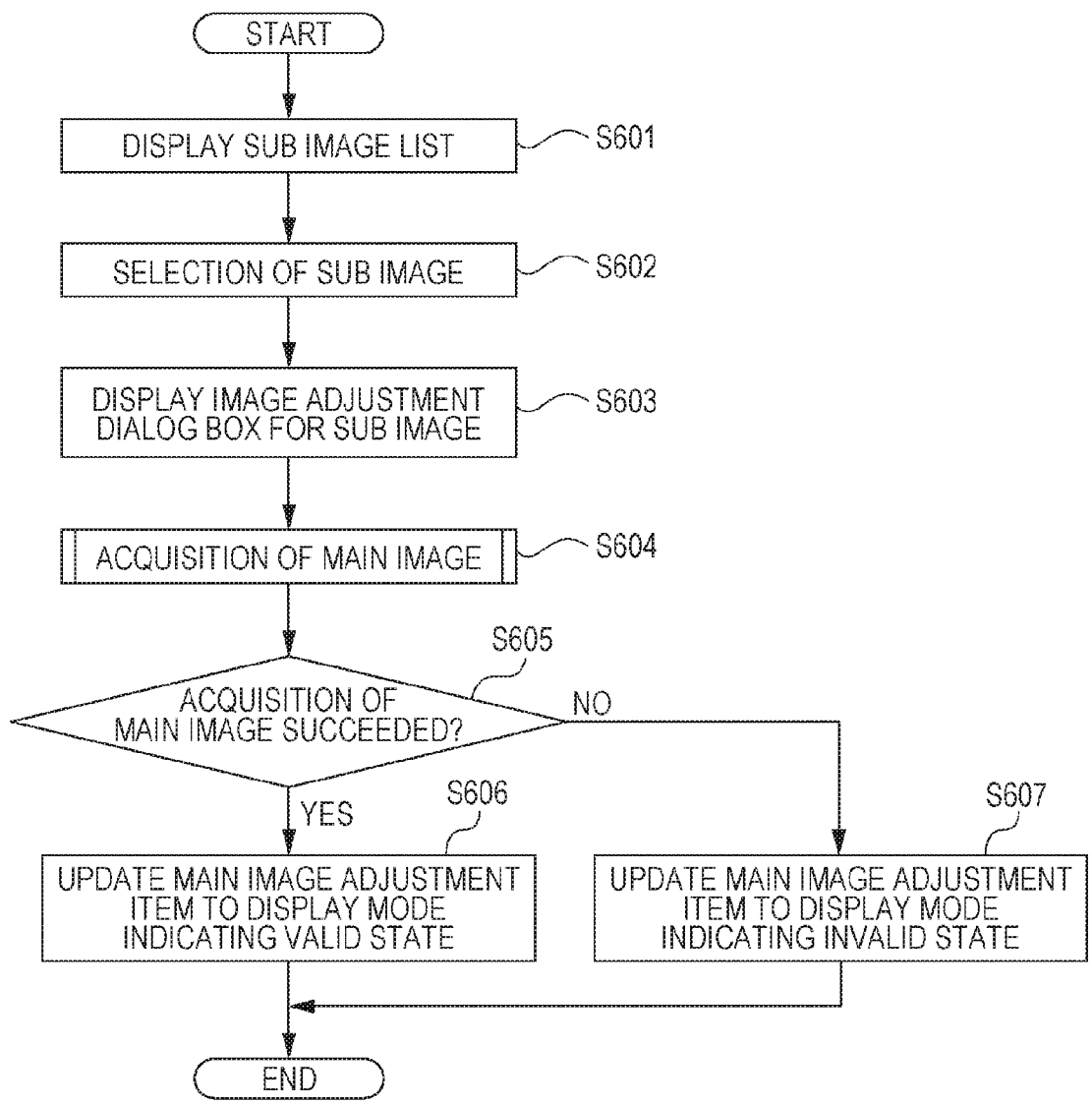

[Fig. 7A]
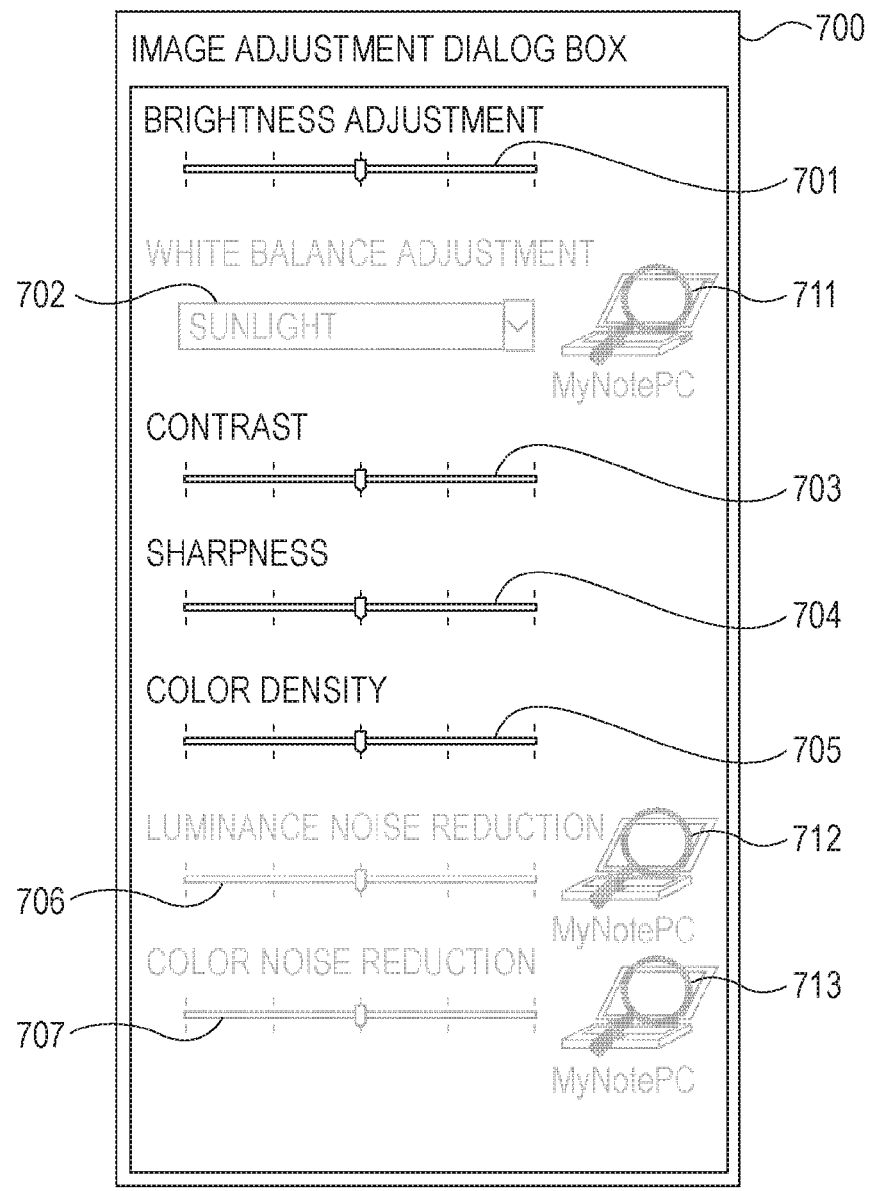

[Fig. 7B]
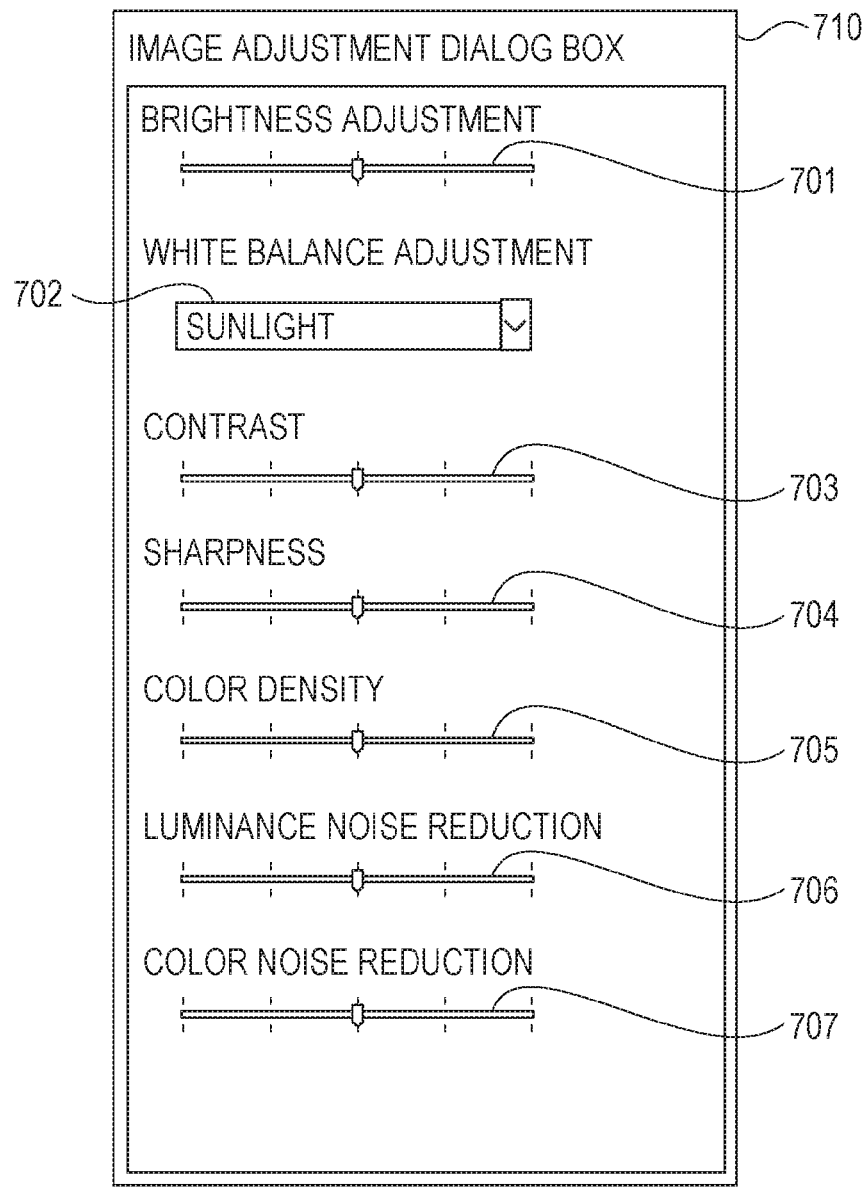

[Fig. 7C]
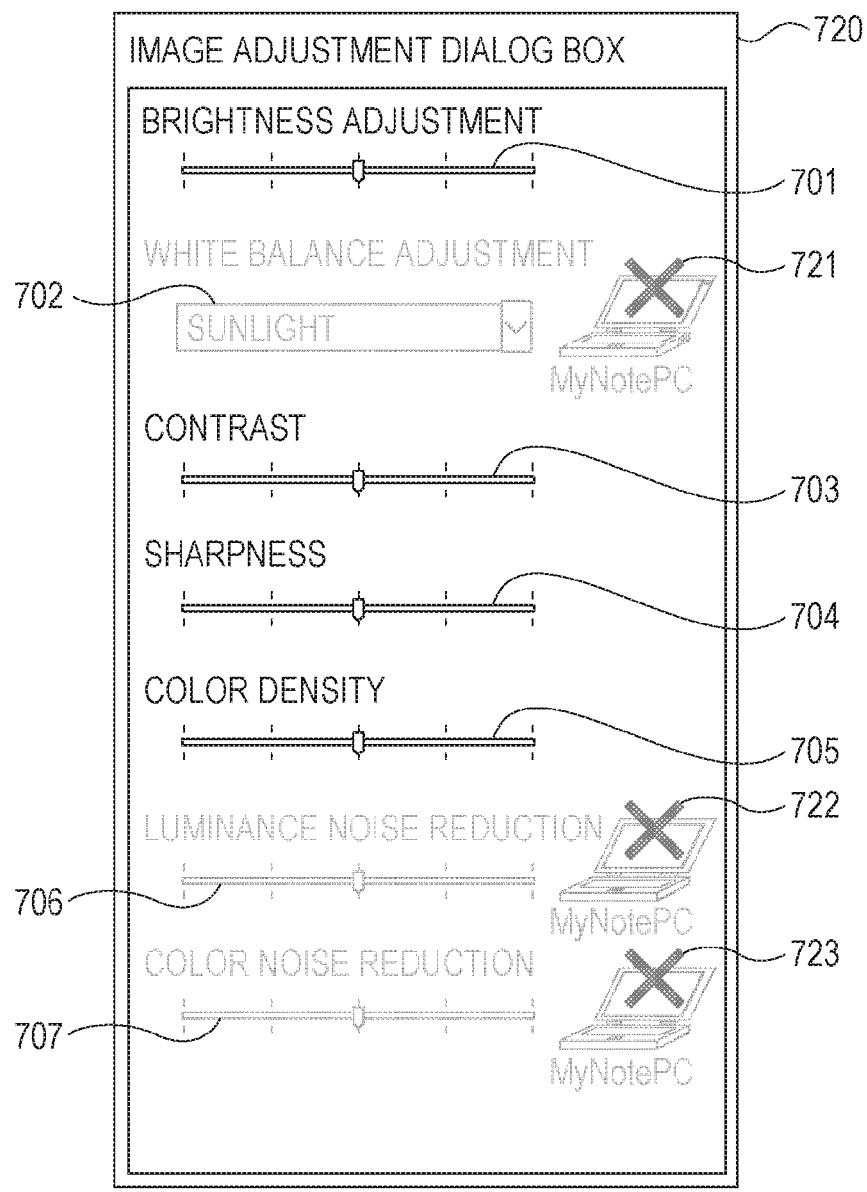

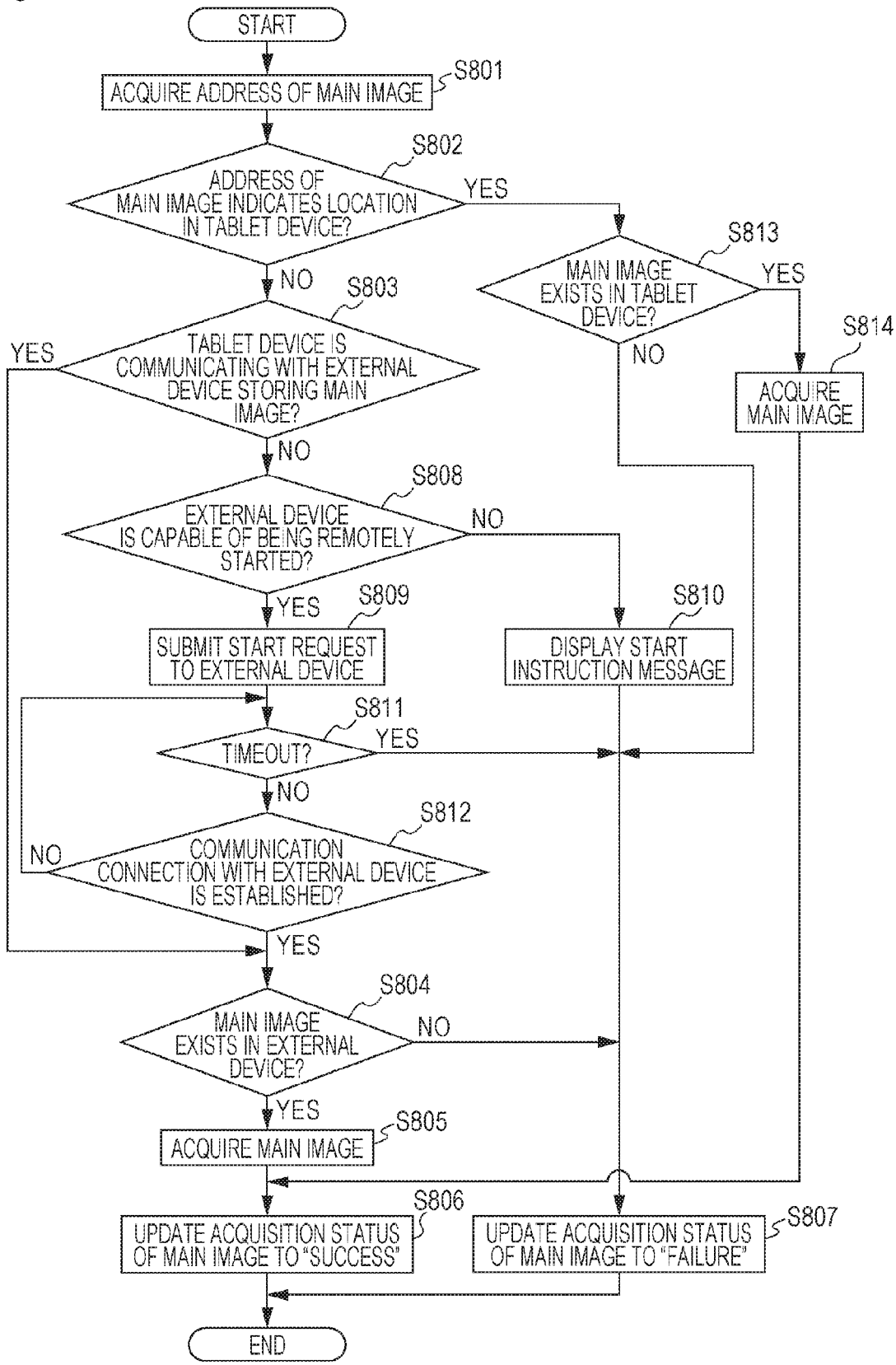
[Fig. 8]

[Fig. 9]
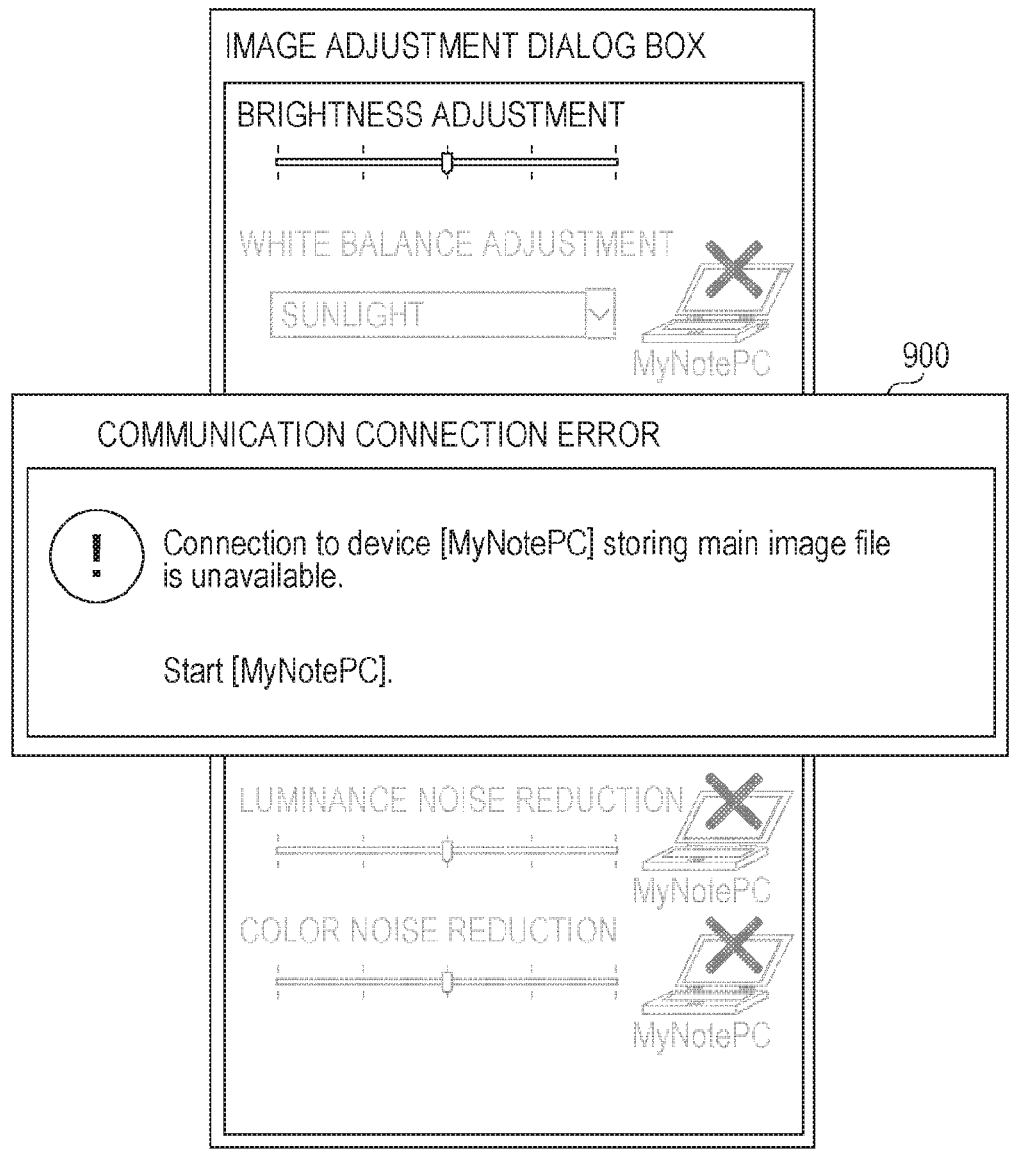

[Fig. 10]
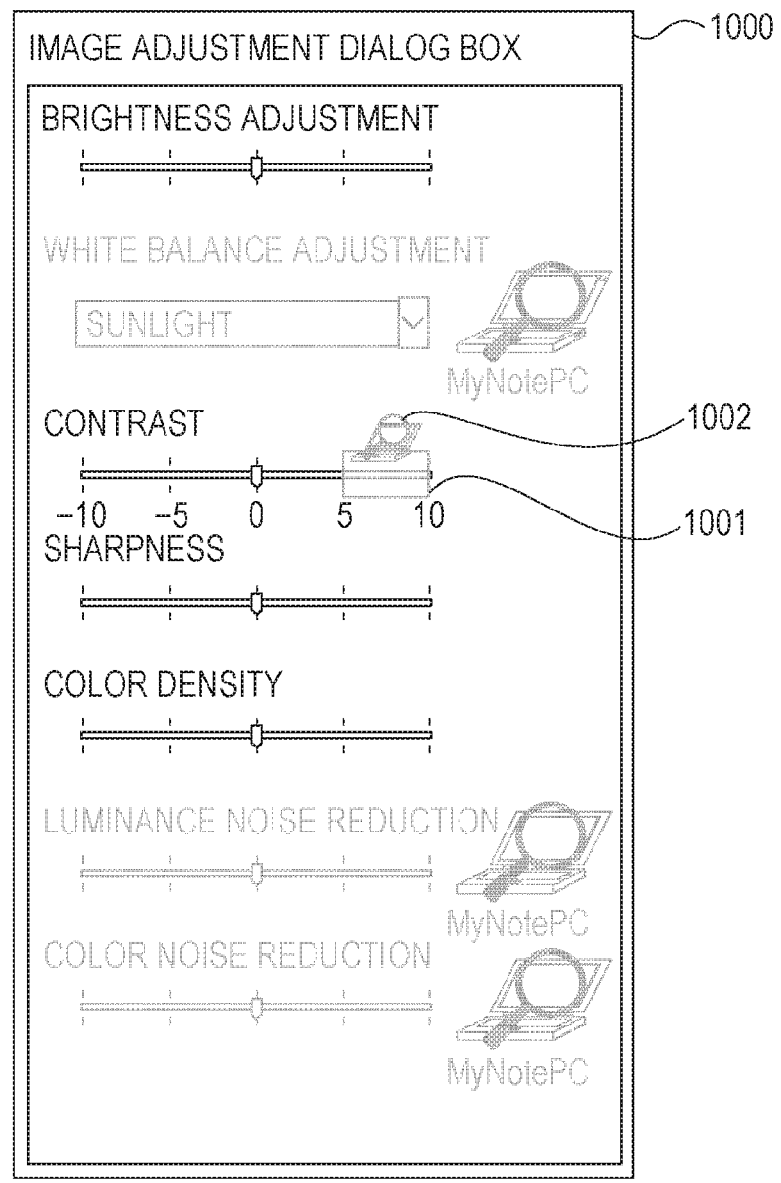

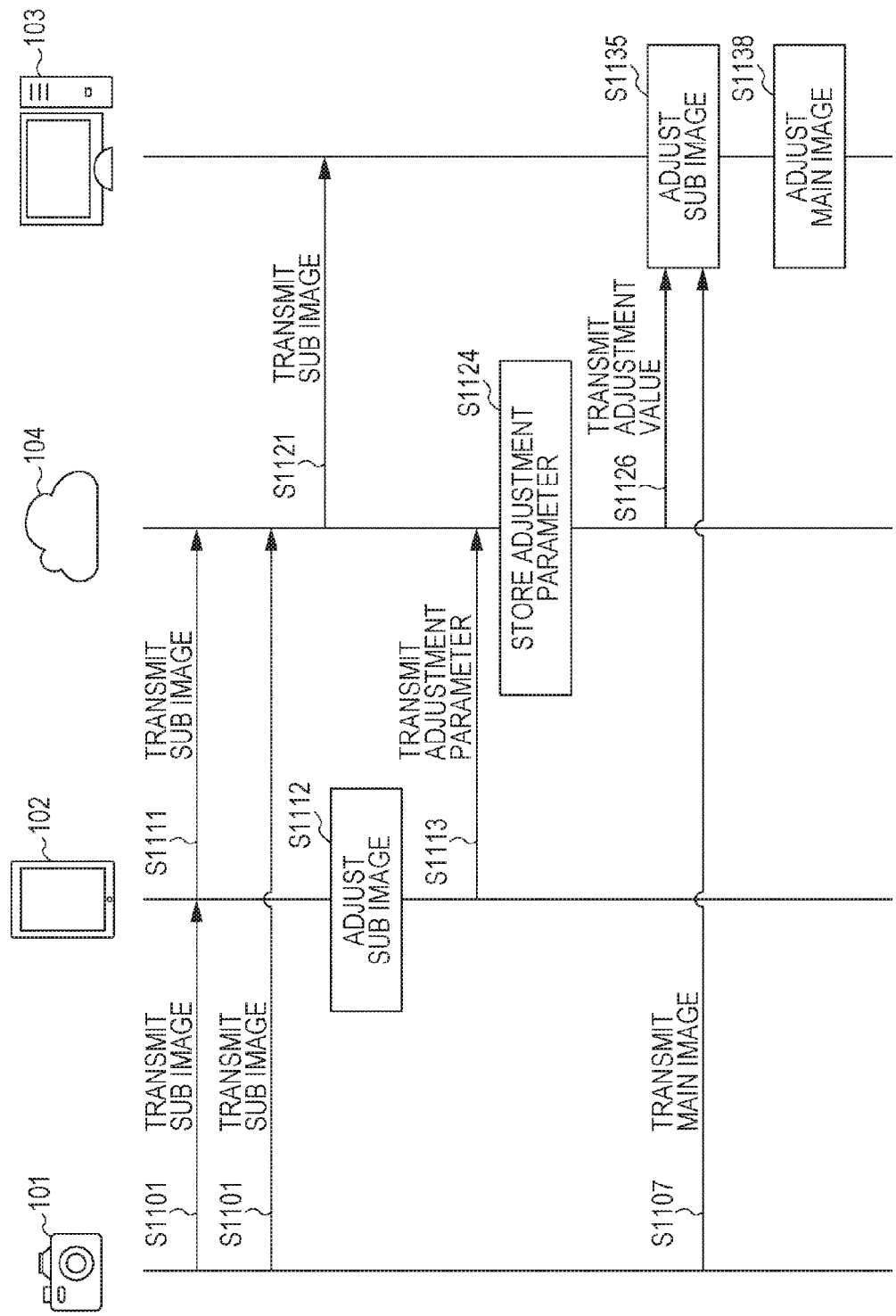

[Fig. 12]
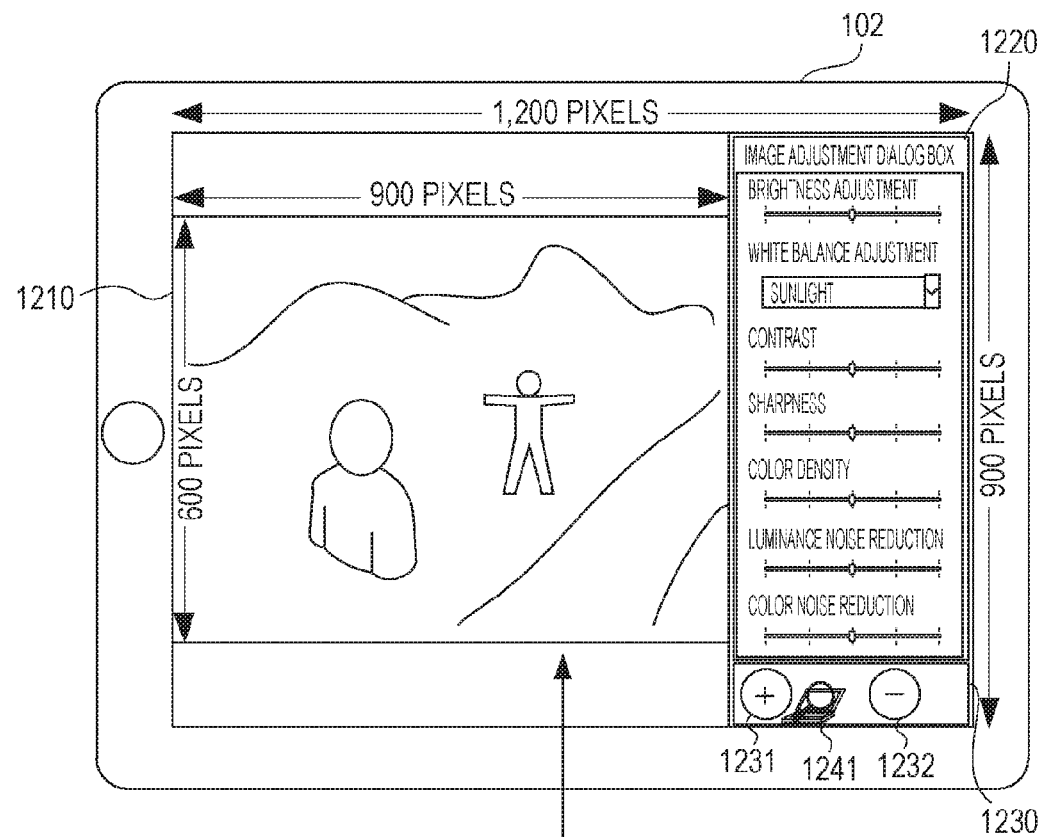
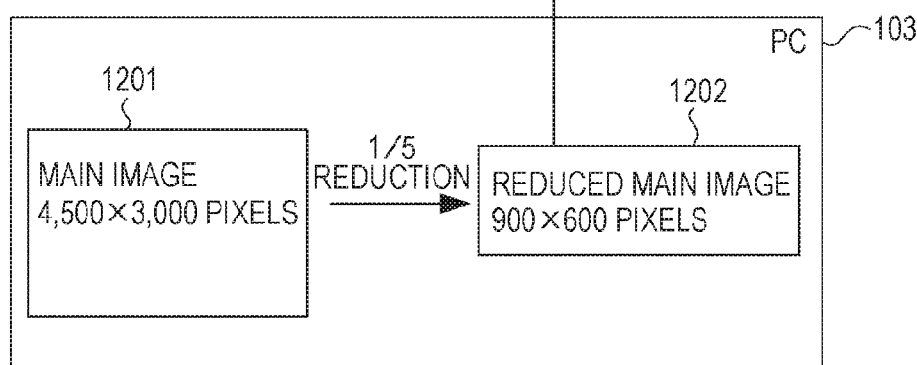

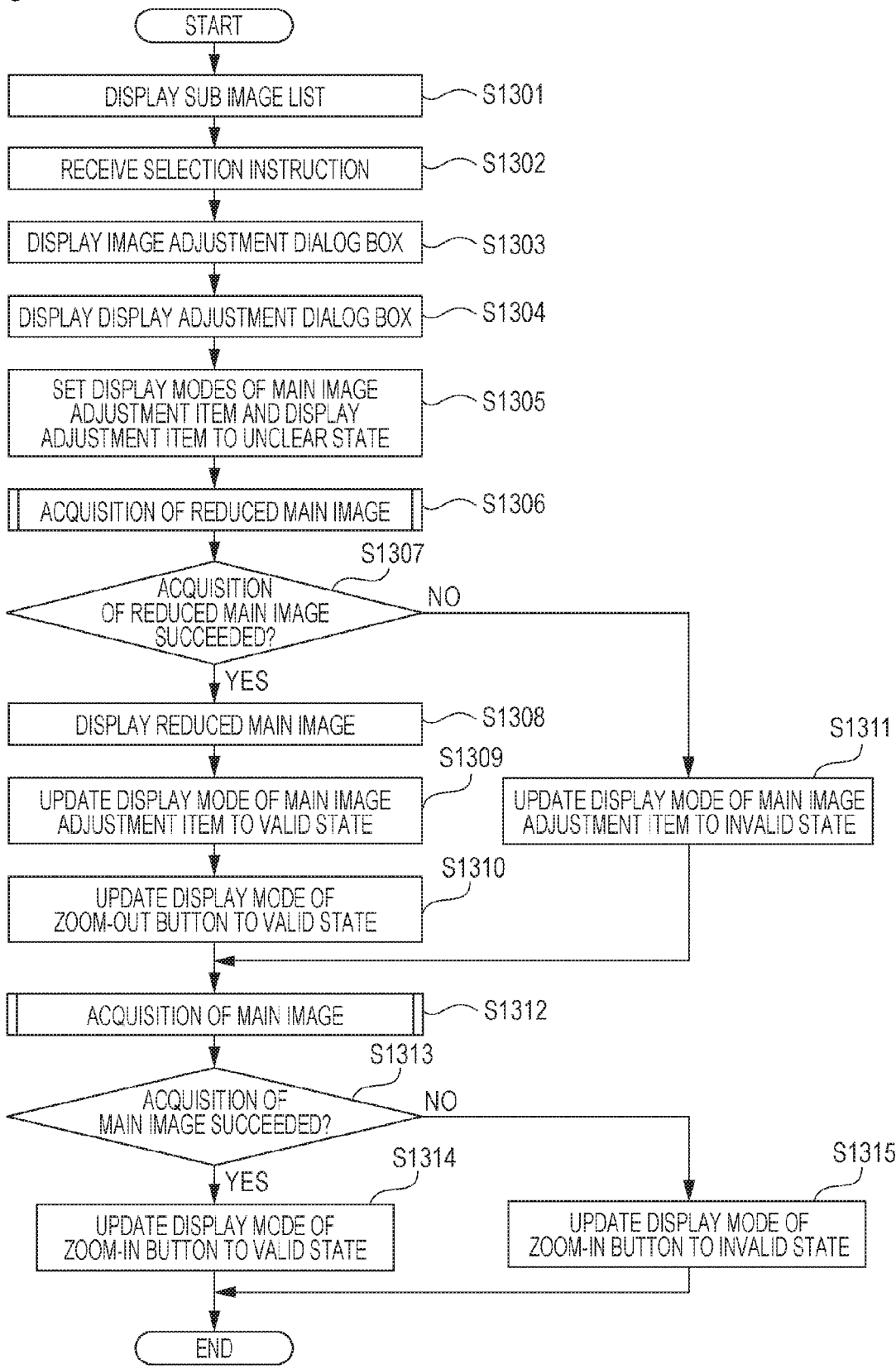
[Fig. 13]

[Fig. 14]
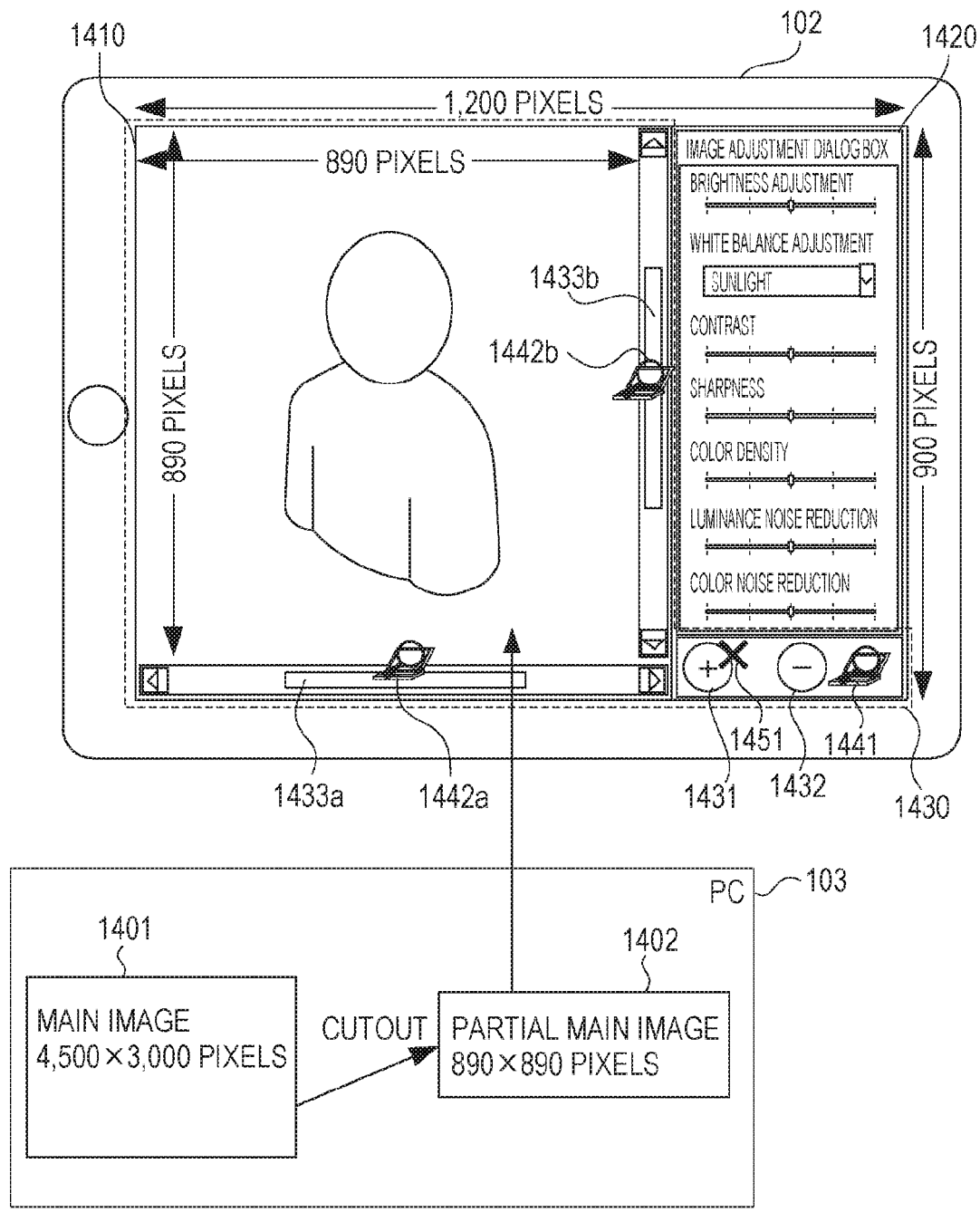

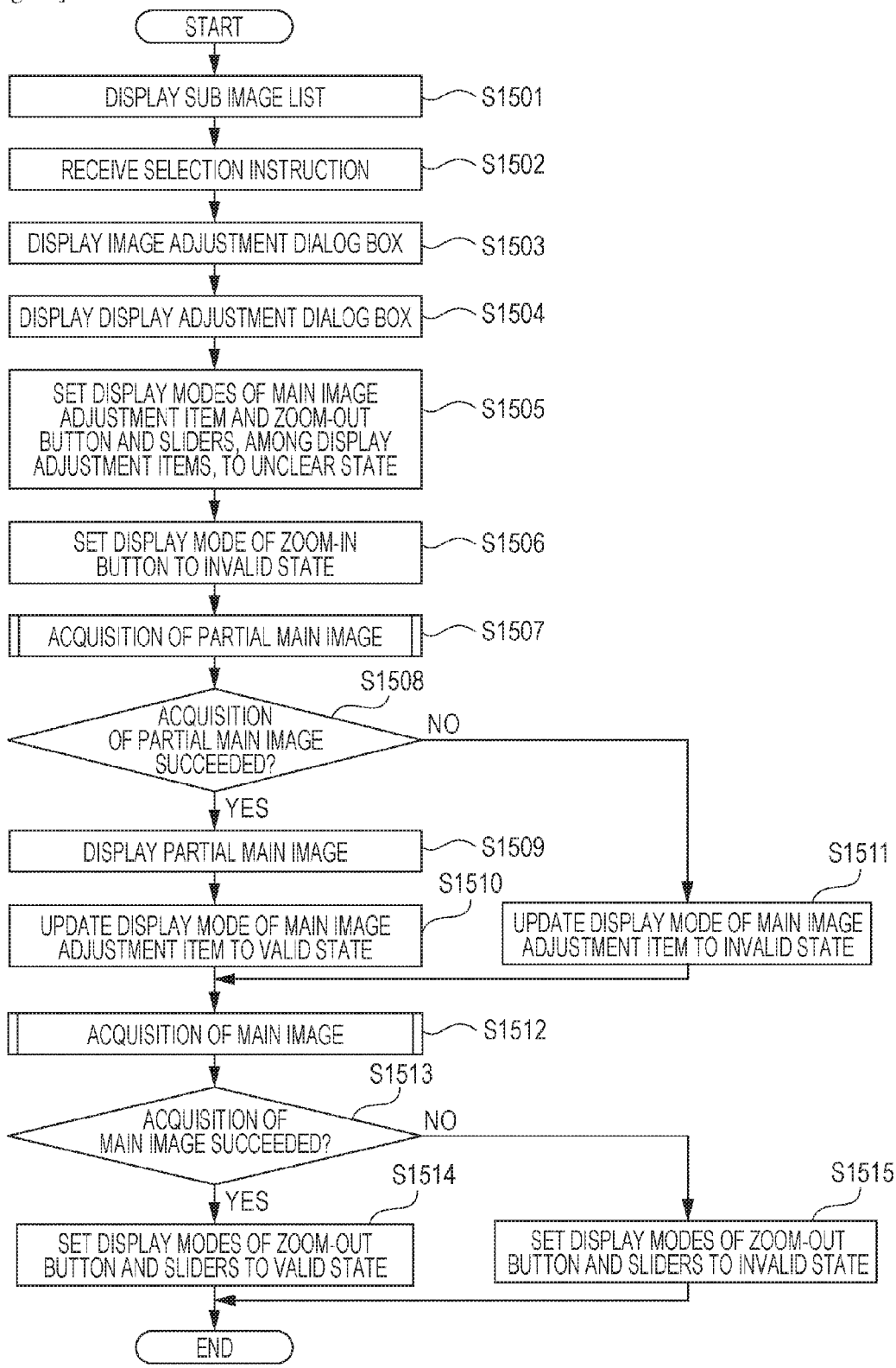
[Fig. 15]

INFORMATION PROCESSING APPARATUS, INFORMATION PROCESSING METHOD, AND PROGRAM

TECHNICAL FIELD

The present invention relates to an information processing apparatus, an information processing method, and a program.

BACKGROUND ART

Digital cameras in recent years, particularly, single-lens reflex cameras adopt a RAW recording mode in which image data that is output from an image pickup element and that is subjected to analog-to-digital conversion is directly recorded on a removable memory, such as a secure digital (SD) card, as a file without performing image processing to the image data. Since the RAW file is not capable of being directly displayed in a display unit after being transferred to an information device, such as a personal computer (PC), the image processing is performed in the information device. A display image file generated by converting the RAW file into a certain file format, such as Joint Photographic Experts Group (JPEG), is displayed in the display unit. Such image processing is generally referred to as development.

The RAW file has the following three features:
1. Since the RAW file is less subject to deterioration in editing, compared with a JPEG image that has been subjected to the development in image capturing and recording, higher image quality is achieved. However, it is necessary to perform the development each time the RAW file is displayed and, thus, there is a problem in that it takes time to process the RAW file.
2. There is a problem in that the RAW file has a file size larger than that of the JPEG file.
3. The RAW file has an image quality adjustment function (hereinafter referred to as a RAW function) that is unavailable for the JPEG file subjected to the development and that is only available for the RAW file before the development.

It is desirable that the JPEG file be normally used when the image is simply viewed from the viewpoint of the features 1 and 2, and that the RAW file be used only when the function specific to the RAW file is used from the viewpoint of the feature 3.

Accordingly, some digital cameras in recent years adopt a RAW+JPEG recording mode in which a RAW file is recorded and at least one JPEG file that is subjected to the development and that is for the same image capturing as that of the RAW file is also simultaneously recorded. In such digital cameras, a set of the RAW file and the JPEG file is transferred to the information device, such as the PC, in the image capturing in the RAW+JPEG recording mode. The information device generally uses the RAW file when the RAW function is used and otherwise uses the JPEG file. RAW data and JPEG data generated from an image signal output from the image pickup element in the same image capturing are hereinafter referred to as simultaneous recording RAW and simultaneous recording JPEG, respectively. In order to realize such a usage, it is necessary to manage the simultaneous recording RAW and the simultaneous recording JPEG in association with each other. PTL 1 discloses a technology to determine whether the simultaneous recording RAW exists in selection of the simultaneous recording JPEG and to disable the RAW function if the simultaneous recording RAW does not exist on the assumption that both the simultaneous recording RAW and the simultaneous recording JPEG exist in the same folder in the same device.

In contrast, new type portable information devices, such as tablets and smartphones, are in widespread use in recent years. Also in such portable information devices, a lot of JPEG files are generally processed with increase in capacity of non-volatile storage media. However, the storage capacities of the portable information devices have not been increased to values appropriate for storage of a lot of RAW files having file sizes larger than those of the JPEG files. Accordingly, it is desirable that the JPEG files be stored in the portable information devices and the RAW files be stored in other devices having larger storage sizes.

However, when the simultaneous recording JPEG and the simultaneous recording RAW are stored in different devices, the RAW function is disabled in the selection of the simultaneous recording JPEG in the related art because the simultaneous recording RAW does not exist in the same device as that of the simultaneous recording JPEG. Accordingly, there is a problem in that a user misunderstands that the RAW function is unavailable even when the simultaneous recording RAW exists in another device.

CITATION LIST

Patent Literature

PTL 1: Japanese Patent Laid-Open No. 2009-303122

SUMMARY OF INVENTION

It is desirable to notify the user of a second image paired with a first image held by a device and whether an adjustment function for the second image is available.

SOLUTION TO PROBLEM

The present invention provides an information processing apparatus including an adjusting unit configured to perform an adjustment process to a first image, in a set of the first image generated by performing a certain process to an image signal output from an image pickup element and a second image generated by not performing the certain process; a setting unit configured to set a parameter used in the adjustment process to the first image or the second image for each adjustment item; an acquiring unit configured to, after the setting unit starts to set the parameter used in the adjustment process to the first image, acquire the second image; and a display unit configured to display a plurality of adjustment items set by the setting unit on a screen and update a display mode of at least one certain adjustment item, among the plurality of adjustment items, depending on an acquisition status of the second image by the acquiring unit to display the certain adjustment item in the updated display mode.

Further features of the present invention will become apparent from the following description of exemplary embodiments with reference to the attached drawings.

BRIEF DESCRIPTION OF DRAWINGS

FIG. 1 is a general view of an image processing system according to a first embodiment.

FIG. 2 is a block diagram illustrating an exemplary configuration of a tablet device.

FIG. 3 illustrates an exemplary data structure of an image management information storage unit.

FIG. 4 illustrates an exemplary data structure of a device management information storage unit.

FIG. 5 is a block diagram illustrating an exemplary configuration of a personal computer (PC).

FIG. 6 is a flowchart illustrating an exemplary image adjustment process in the tablet device.

FIG. 7A illustrates an example of how an image adjustment dialog box is displayed.

FIG. 7B illustrates an example of how an image adjustment dialog box is displayed.

FIG. 7C illustrates an example of how an image adjustment dialog box is displayed.

FIG. 8 is a flowchart illustrating an exemplary main image acquisition process in the tablet device.

FIG. 9 illustrates an example of how a communication connection error dialog box is displayed.

FIG. 10 illustrates an example of how an image adjustment dialog box is displayed.

FIG. 11 is a sequence diagram illustrating an exemplary main image acquisition process in an image processing system according to a second embodiment.

FIG. 12 is a diagram illustrating an example of how a reduced main image and an image adjustment dialog box are displayed in a third embodiment.

FIG. 13 is a flowchart illustrating an exemplary main image acquisition process using the reduced main image in the tablet device according to the third embodiment.

FIG. 14 is a diagram illustrating an example of how a partial main image and an image adjustment dialog box are displayed.

FIG. 15 is a flowchart illustrating an exemplary main image acquisition process using the partial main image in the tablet device according to the third embodiment.

DESCRIPTION OF EMBODIMENTS

Embodiments of the present invention will herein be described with reference to the attached drawings.

First Embodiment

FIG. 1 is a general view of an image processing system according to a first embodiment. The image processing system includes a digital camera 101 functioning as an image pickup apparatus, a tablet device 102 functions as an information processing apparatus, a personal computer (PC) 103 functioning as an external device, and a server apparatus 104. The digital camera 101 may be set so as to perform image capturing in response to one image capturing instruction, generate image data of one format, among multiple formats, and record the image. Alternatively, the digital camera 101 may be set so as to perform the image capturing in response to one image capturing instruction, generate pieces of image data of multiple formats, and record a set of the pieces of image data. The pieces of image data of multiple formats in the embodiments are referred to as a main image and a sub image. The mode in which the set of the pieces of image data of the multiple formats is recorded in response to one image capturing instruction is referred to as a simultaneous recording mode in the embodiments. The main image is, for example, RAW image data. The main image results from high-efficiency coding of data output from an image pickup element using a technology, such as wavelet transform or differential encoding, and conversion of the data into a compressed state. In other words, the main image is an image in which the data output from the image pickup element is substantially directly recorded. The main image is subjected to lossless compression. The sub image is, for example, JPEG image data. The sub image results from the high-efficiency coding of data output from an image pickup element using a technology, such as the wavelet transform or the differential encoding, conversion of the data into a compressed state, and development and compression in the JPEG format of the data for recording. In the embodiments, the main image and the sub image are generated on the basis of an image signal output from the image pickup element in the image capturing performed in response to the same image capturing instruction. The sub image may be generated by performing the development to the main image with a certain adjustment value. In other words, the main image may be referred to as unprocessed data and the sub image may be referred to as processed data in the embodiments. Although the data output from the image pickup element is less subject to deterioration in the main image, compared with the sub image, the main image has a data size larger than that of the sub image.

The digital camera 101 acquires the main image and the sub image in the simultaneous recording mode. The digital camera 101 transmits the main image to the PC 103 and the server apparatus 104 and transmits the sub image to the tablet device 102. In other words, the main image and the corresponding sub image are stored in different apparatuses in the image processing system in the embodiments.

The tablet device 102 stores the sub image received from the digital camera 101 and other image files including the JPEG file. The tablet device 102 is capable of displaying thumbnail images of these image files. Upon selection of a thumbnail image corresponding to the sub image by a user, the tablet device 102 is capable of acquiring the main image corresponding to the selected sub image from the external device and displaying the main image.

The PC 103 includes a storage unit having a relatively large storage capacity, compared with that of a storage unit in the tablet device 102. The storage unit is a hard disk drive having a large memory capacity of, for example, one terabyte. The main image received from the digital camera 101 is stored in the storage unit in the PC 103. The server apparatus 104 also includes a storage unit having a relatively large storage capacity, compared with that of the storage unit in the tablet device 102. The main image received from the digital camera 101 is stored in the storage unit in the server apparatus 104. The main images stored in the PC 103 and the server apparatus 104 correspond to the sub image stored in the tablet device 102.

A router 105 provides a routing function used when the respective devices (the digital camera 101, the tablet device 102, the PC 103, and the server apparatus 104) in the image processing system perform communication. Since WiFi, which is currently common in wireless communication, is used as the communication method in the embodiments, a WiFi router is generally used as the router 105. However, the router 105 is not limited to the WiFi router. Each device in the image processing system in the embodiments supports Wake-on-LAN (WOL). Specifically, transmission of a Magic Packet from one device to another device allows the other device to be started or be shut down.

FIG. 2 is a block diagram illustrating an exemplary configuration of the tablet device 102. Referring to FIG. 2, a central processing unit (CPU) 201 controls the entire tablet device 102. A solid state drive (SSD) 202 functions as a non-volatile memory. In devices, such as the tablets, which are often carried by the users, the SSD is generally used, instead of a hard disk drive (HDD) that has been generally used in the PC, because the SSD has small power consumption and is highly resistant to shock. However, since the SSD has a unit price per bit higher than that of the HDD, the capacity of the SSD generally provided in the tablet is, for example, 16 GB and the SSD is not suitable for storage of a lot of RAW image files.

The SSD 202 stores, for example, a sub image 203 acquired through the image capturing in the simultaneous recording mode in the digital camera 101. The main image has not been transmitted from the digital camera 101 so that the capacity of the SSD 202 is not squeezed.

An image management information storage unit 204 store image management information about each sub image stored in the SSD 202. The image management information indicates a file path to the sub image in the tablet device 102 and a file path to another device in which the main image corresponding to the sub image is stored. FIG. 3 illustrates an exemplary data structure of the image management information storage unit 204. Referring to FIG. 3, image management information 301 is an information area for the main image corresponding to a sub image "IMG_0001.JPG." Image management information 302 is an information area for the main image corresponding to a sub image "IMG_0002.JPG."

The image management information 301 includes an address 311 where the sub image "IMG_0001.JPG" is stored and an address 312 where the main image corresponding to the sub image is stored. "/0" at the beginning of the address 311 and "/1" at the beginning of the address 312, which are delimited by a delimiter (/), each indicate a device identifier (ID) identifying the device where the main image is stored. Information about the device ID is stored in a device management information storage unit 205 described below. Each piece of image management information includes an address where the sub image is stored and an address where the main image corresponding to the sub image is stored.

Referring back to FIG. 2, the device management information storage unit 205 stores information about each device in the image processing system. A program storage unit 206 stores programs used by the tablet device 102 to perform various functions and a basic operating system program 214. The programs stored in the program storage unit 206 are read into a dynamic random access memory (DRAM) 207 capable of reading and writing at higher speed as a primary memory and are sequentially executed by the CPU 201. The function and processing of the tablet device 102 described below are realized by reading out the programs stored in the SSD 202 and executing the programs by the CPU 201. FIG. 4 illustrates an exemplary data structure of the device management information storage unit 205. Referring to FIG. 4, server information 401 is device information about the server apparatus 104. PC information 402 is device information about the PC 103. Digital camera information 403 is device information about the digital camera 101.

The PC information 402 includes a device ID 411, a WiFi device ID 412, a device display name 413, icon data 414, and WOL support information 415. The device ID 411 is a device ID identifying the PC 103. "1" is written into the device ID 411 in the example illustrated in FIG. 4. The device ID "1" is the device ID of the PC 103. In other words, the PC information 402 is information about the PC 103. The address 312 of the main image in the image management information 301 illustrated in FIG. 3 and the device ID 411 indicate that the main image corresponding to the sub image "IMG_0001.JPG" is stored in the PC 103. The WiFi device ID 412 is a communication ID used for WiFi connection with the PC 103.

The device display name 413 is a character string indicating a name used by the user to recognize the device and is set in advance by the user. In the example illustrated in FIG. 4, "MyNotePC" is written into the device display name 413. The icon data 414 is data for displaying an icon used by the user to recognize the device and is set in advance by the user. The WOL support information 415 is information indicating whether WOL is supported. The WOL support information indicates whether a target device is capable of being started by transmitting a start packet (Magic Packet) to the target device using a function, such as Wake on LAN (WOL), while the target device is being shut down or is sleeping. When the target device is capable of being started, "YES" is written into the WOL support information 415.

Referring back to FIG. 2, a control program 208 controls various operations that are not explicitly specified, such as control of execution sequences of various programs. A display control program 209 controls display in a display unit 215. An image processing program 210 performs a variety of image processing (brightness adjustment, contrast adjustment, sharpness adjustment, color density adjustment, noise reduction, and white balance adjustment) for images. Upon selection of an arbitrary sub image from the multiple sub images by the user, a main image acquisition program 211 searches for the main image corresponding to the selected sub image in another device and acquires the main image.

A communication control program 212 controls a communication unit 217. A working memory 213 is a memory area used as a working memory in execution of each program on the DRAM 207. The display unit 215 is, for example, a common liquid crystal display. An input unit 216 is, for example, a touch panel. The communication unit 217 communicates with another device via the Internet. An internal bus 218 is used to transmit and receive data and commands between the components in the tablet device 102. The other components that are not illustrated in FIG. 2 are the same as those in common tablet devices.

FIG. 5 is a block diagram illustrating an exemplary configuration of the PC 103. Referring to FIG. 5, a CPU 501 controls the entire PC 103. An HDD 502 functions as a non-volatile memory. The HDD 502 has a capacity of, for example, about 500 GB. The HDD 502 stores, for example, a main image 503 acquired through the image capturing in the simultaneous recording mode in the digital camera 101. The data size of the main image 503 is varied depending on the complicity of the captured image and is about 20 MB. Accordingly, about 25,000 main images are capable of being stored in the HDD 502 of 500 GB. In other words, the storage capacity of the HDD 502 may be sufficient from the viewpoint of the frequency of image capturing by a general user.

A program storage unit 504 stores programs used by the PC 103 to perform various functions and a basic operating system program 509. The programs are read into a DRAM 505 capable of reading and writing at higher speed as a primary memory and are sequentially read out and executed by the CPU 501. The function and processing of the PC 103 described below are realized by reading out the programs stored in the HDD 502 and executing the programs by the CPU 501. A control program 506 controls various operations that are not explicitly specified in the other programs, such as control of a display unit 510. A communication control program 507 controls a communication unit 512. A working memory 508 is a memory area used as a working memory in execution of each program on the DRAM 505.

The display unit 510 is, for example, a liquid crystal display. An input unit 511 includes, for example, a keyboard and a mouse. The communication unit 512 communicates with another device via the Internet. A power switch 513 is a button operated by the user to start or shut down the PC 103. An internal bus 514 is used to transmit and receive data and commands between the components in the PC 103. The other components that are not illustrated in FIG. 5 are the same as those in common notebook PCs.

FIG. 6 is a flowchart illustrating an exemplary operation when an adjustment process is performed to a set of a main image and a sub image in the tablet device 102. Although a case is exemplified in which the tablet device 102 acquires the main image corresponding to the sub image from the PC 103, the same adjustment process applies to a case in which the tablet device 102 acquires the main image corresponding to the sub image from the server apparatus 104. The following operation is realized by the CPU 201 in the tablet device 102, which executes the various programs including the operating system (OS) 214, the display control program 209, and the main image acquisition program 211.

Referring to FIG. 6, in Step S601, the CPU 201 in the tablet device 102 displays a list of the sub images recorded in the SSD 202 in the display unit 215. Specifically, the CPU 201 displays a list of thumbnail images of the sub images. In Step S602, the CPU 201 accepts a selection instruction upon selection of an arbitrary sub image from the list of the sub images by a user's operation.

In Step S603, the CPU 201 executes the display control program 209 to display an image adjustment dialog box as an image adjustment user interface (UI). The image adjustment dialog box is an exemplary setting screen that is displayed to set multiple adjustment items including the brightness and the white balance for the sub image that is selected or the main image corresponding to the sub image. The CPU 201 executes the display control program 209 to set the adjustment items for the main image, among the multiple adjustment items displayed in the image adjustment dialog box, to an unclear state. The unclear state is a state in which it is determined that whether the main image is acquired is not clear because the CPU 201 does not start an acquisition process of the main image and a state in which whether the main image is available, that is, whether the adjustment of the main image is enabled is not clear. The adjustment items for the main image are set to the unclear state also until the acquisition is completed (while the main image is being acquired) since the CPU 201 has started the acquisition process of the main image.

FIG. 7A illustrates an example of an image adjustment dialog box 700 displayed in Step S603. The adjustment items adjustable for the sub image or the main image corresponding to the sub image are displayed in the image adjustment dialog box 700. In the example illustrated in FIG. 7A, brightness adjustment 701, white balance adjustment 702, contrast 703, sharpness 704, color density 705, luminance noise reduction 706, and color noise reduction 707 are displayed as the adjustment items. The white balance adjustment 702 is a UI for accepting a change instruction for a white balance type, among multiple white balance types, in response to an operation by the user. Each of the brightness adjustment 701, the contrast 703, the sharpness 704, the color density 705, the luminance noise reduction 706, and the color noise reduction 707 is a UI for accepting a change instruction in response to an operation by the user with the corresponding slider.

It is assumed in the embodiments that the brightness adjustment 701, the contrast 703, the sharpness 704, and the color density 705 are the adjustment items that are adjustable for not only the main image but also the sub image. The items adjustable for the sub image are hereinafter referred to as sub image adjustment items. In contrast, it is assumed in the embodiments that the white balance adjustment 702, the luminance noise reduction 706, and the color noise reduction 707 are the adjustment items that are adjustable for the main image but are not adjustable for the sub image. The items adjustable only for the main image are hereinafter referred to as main image adjustment items.

The adjustment process based on parameters set in the main image adjustment items is applicable to the sub images. However, since the sub images have low image quality due to the effect of noise in compression or the like, have smaller numbers of color tones, have smaller numbers of pixels, compared with the main images, application of the same adjustment process to the sub images and the main images produces different adjustment results to possibly cause a large visual difference. Accordingly, in the embodiments, when the same adjustment process is applied to the sub images and the main images, the adjustment items that have high probability of small differences between the adjustment results are set as the sub image adjustment items and the adjustment items that have high probability of large differences between the adjustment results are set as the main image adjustment items.

In order to perform the adjustment corresponding to the main image adjustment items, the tablet device 102 desirably acquires the main image corresponding to the sub image selected in Step S602 from another device. The adjustment for the main image adjustment items is not enabled until the main image is acquired.

Whether the tablet device 102 is capable of using the main image is not clear in Step S603. Accordingly, the CPU 201 in the tablet device 102 sets the main image adjustment items to the unclear state. The CPU 201 displays the main image adjustment items in a display mode indicating the unclear state. In contrast, the CPU 201 displays the sub image adjustment items in a display mode indicating a valid state because the sub image has been acquired. Accordingly, the user is capable of easily discriminating between the adjustment items in the unclear state and the adjustment items in the valid state, among the adjustment items included in the image adjustment dialog box.

In the example illustrated in FIG. 7A, unclear state icons 711, 712, and 713 are displayed in association with the white balance adjustment 702, the luminance noise reduction 706, and the color noise reduction 707, respectively, which are the main image adjustment items. In contrast, the unclear state icons corresponding to the brightness adjustment 701, the contrast 703, the sharpness 704, and the color density 705, which are the sub image adjustment items, are not displayed in the example illustrated in FIG. 7A. Accordingly, the user is capable of recognizing that the adjustment items: the white balance adjustment 702, the luminance noise reduction 706, and the color noise reduction 707 are in the unclear state and that the adjustment process concerning the parameters set for the adjustment items is disabled. In addition, the user is capable of recognizing that the adjustment process concerning the parameters set for the adjustment items: the brightness adjustment 701, the contrast 703, the sharpness 704, and the color density 705 is enabled. In the display mode indicating the unclear state, the adjustment items may be displayed in a state (setting disabled state) in which the setting of the adjustment items is disabled so that the settings for the adjustment items are not accepted.

Furthermore, as illustrated in FIG. 7A, the CPU 201 displays the name of the device in which the main image corresponding to the sub image selected with the unclear state icons 711, 712, and 713 is stored. At this time, the CPU 201 identifies the external device where the main image is stored with reference to the address of the main image included in the image management information about the selected sub image in the image management information storage unit 204. The CPU 201 identifies the name of the identified external device from the information in the device management information storage unit 205 and displays the name of the external device.

Referring back to FIG. 6, in Step S604, the CPU 201 executes the main image acquisition program 211 to perform a main image acquisition process. The main image acquisition process is a process in which the CPU 201 acquires the main image corresponding to the sub image selected by the user from the tablet device 102 or the external device and performs the image adjustment to the acquired main image. The main image acquisition process will be described in detail below with reference to FIG. 8.

In Step S605, the CPU 201 executes the control program 208 to determine whether the acquisition of the main image succeeded. If the acquisition of the main image succeeded (YES in Step S605), the process goes to Step S606. If the acquisition of the main image did not succeed (NO in Step S605), the process goes to Step S607.

In Step S606, the CPU 201 executes the display control program 209 to set the main image adjustment items in the image adjustment dialog box to the valid state and update the display mode of the main image adjustment items to the display mode indicating the valid state. The valid state is a state in which the adjustment using the parameters set in the adjustment items is enabled. The CPU 201 updates the display mode of the main image adjustment items so as to indicate the valid state and updates the unclear state icons displayed near the main image adjustment items so as not to be displayed. FIG. 7B illustrates an example of how an image adjustment dialog box 710 is displayed after the acquisition of the main image succeeded. The unclear state icons 711, 712, and 713 displayed in association with the white balance adjustment 702, the luminance noise reduction 706, and the color noise reduction 707, respectively, which are the main image adjustment items, are not displayed in the example illustrated in FIG. 7B. Accordingly, the user is capable of recognizing that the adjustment of the adjustment items: the white balance adjustment 702, the luminance noise reduction 706, and the color noise reduction 707 is enabled, that is, that these adjustment items are available. When the main image adjustment items are displayed in the setting disabled state when the main image adjustment items are in the unclear state, the main image adjustment items are updated so as to be displayed in a setting valid state.

The parameters of the sub image adjustment items set for the sub image before the main image is acquired or while the main image is being acquired are applied in the image adjustment of the main image. Specifically, both the parameters of the sub image adjustment items set before the main image is acquired or while the main image is being acquired and the parameters of the main image adjustment items set after the main image is acquired are applied to the image adjustment of the acquired main image. The setting of the sub image adjustment items is enabled after the main image is acquired and the parameters of the sub image adjustment items set before the main image is acquired or while the main image is being acquired may be varied after the main image is acquired.

In Step S607, the CPU 201 executes the display control program 209 to set the main image adjustment items in the image adjustment dialog box to an invalid state and updates the display mode of the main image adjustment items to a display mode indicating the invalid state. The invalid state is a state in which the adjustment items are unavailable. The CPU 201 causes the unclear state icons displayed in association with the main image adjustment items not to be displayed. In addition, the CPU 201 displays an invalid icon indicating the invalid state near each of the main image adjustment items. FIG. 7C illustrates an example of how an image adjustment dialog box 720 is displayed after the acquisition of the main image failed. The unclear state icons 711, 712, and 713 displayed in association with the white balance adjustment 702, the luminance noise reduction 706, and the color noise reduction 707, respectively, which are the main image adjustment items, are not displayed in the example illustrated in FIG. 7C. Instead of the unclear state icons 711, 712, and 713, invalid icon 721, 722, and 723 are displayed in association with the white balance adjustment 702, the luminance noise reduction 706, and the color noise reduction 707, respectively. Accordingly, the user is capable of recognizing that the adjustment of the main image adjustment items: the white balance adjustment 702, the luminance noise reduction 706, and the color noise reduction 707 is disabled because the acquisition of the main image corresponding to the sub image is disabled.

The states of the adjustment items are set or updated depending on the acquisition status of the main image and the adjustment items are appropriately displayed in the display mode corresponding to the acquisition status of the main image in Step S606 and Step S607. Although the icons corresponding to the acquisition status of the main image are appropriately displayed in association with the adjustment items to vary the display mode in the first embodiment, the first embodiment is not limited to the display of the icons corresponding to the acquisition status of the main image. For example, the CPU 201 may vary the display color of the adjustment items, may add a frame to each of the adjustment items, or may display a character string indicating an annotation near each of the adjustment items depending on the acquisition status of the main image.

The CPU 201 may vary the target of the image adjustment process from the sub image to the acquired main image immediately after Step S606. Then, the CPU 201 may perform the development of the main image in accordance with the parameter set for each adjustment item and may display the result of the development on the screen. In this case, the display of the result of the image adjustment using the sub image is quickly switched to the display of the result of the image adjustment using the main image with no operation by the user.

Alternatively, after Step S606, upon acceptance of a setting operation of the parameters for the main image adjustment items by the user, the CPU 201 may switch the target of the adjustment process from the sub image to the acquired main image. In this case, the display of the result of the image adjustment using the sub image is quickly switched to the display of the result of the image adjustment using the main image with no operation by the user. Accordingly, since the development of the main image is not performed if the development of the main image is not desired, it is possible to reduce the load on the development.

FIG. 8 is a flowchart illustrating an exemplary operation in the main image acquisition process in the tablet device 102. Referring to FIG. 8, in Step S801, the CPU 201 in the tablet device 102 executes the main image acquisition program 211 to acquire the address of the main image indicating a location where the main image is stored. Specifically, the CPU 201 acquires the address of the main image corresponding to the sub image on the basis of the image management information about the sub image selected by the user in the image management information storage unit 204. It is assumed here that the sub image "IMG_0001.JPG" has been selected in Step S601. In this case, the CPU 201 acquires the address "/1/Picture/folder1/IMG_0001.RAW" of the main image included in the image management information about the sub image "IMG_0001.JPG" in the image management information storage unit 204. It is assumed here that "non-acquisition" is set as an initial value of the acquisition status of the main image corresponding to the selected sub image.

In Step S802, the CPU 201 confirms whether the location where the main image is stored is in the tablet device 102 from the acquired address. If the location where the main image is stored is in the tablet device 102 (YES in Step S802), the process goes to Step S813. If the location where the main image is stored is not in the tablet device 102 (NO in Step S802), the process goes to Step S803. In Step S803, the CPU 201 executes the communication control program 212 to determine whether the tablet device 102 is communicating with the external device (the PC 103) storing the main image. If the tablet device 102 is communicating with the external device (YES in Step S803), the process goes to Step S804. If the tablet device 102 is not communicating with the external device (NO in Step S803), the process goes to Step S808.

In Step S804, the CPU 201 executes the communication control program 212 to confirm whether the main image is stored in the address acquired in Step S801 through an inquiry to the PC 103. Specifically, the CPU 201 inquires of the PC 103 whether the main image exists in the folder path "/Picture/folder1/IMG_0001.RAW" with reference to the address of the main image acquired in Step S801. If the main image is stored in the PC 103 (YES in Step S804), the process goes to Step S805. If the main image is not stored in the PC 103 (NO in Step S804), the process goes to Step S807.

In Step S805, the CPU 201 executes the communication control program 212 to transmit a request for the main image to the PC 103 storing the main image. The CPU 201 receives the main image from the PC 103 and writes the received main image into the working memory 213. In Step S806, the CPU 201 determines that the acquisition of the main image succeeded and updates the acquisition status of the main image from "non-acquisition" to "success of acquisition". Then, the main image acquisition process illustrated in FIG. 8 is terminated. In Step S807, the CPU 201 determines that the acquisition of the main image failed because the main image has not been acquired, stores the result of the determination in the working memory 213, and updates the acquisition status of the main image from "non-acquisition" to "failure of acquisition." Then, the main image acquisition process illustrated in FIG. 8 is terminated.

In Step S808, the CPU 201 submits a start request to the PC 103 to determine whether the PC 103 is capable of being remotely started. Specifically, the CPU 201 executes the communication control program 212 to refer to the WOL support information about the PC 103 in the device management information storage unit 205. If the PC 103 is capable of being started in response to the start request (YES in Step S808), the process goes to Step S809. If the PC 103 is not capable of being started in response to the start request (NO in Step S808), the process goes to Step S810. In Step S809, the CPU 201 executes the communication control program 212 to submit the start request (Magic Packet) to the PC 103. Upon reception of the start request, the PC 103 is started and the communication connection with the tablet device 102 is established. In Step S810, the CPU 201 executes the display control program 209 to display a communication connection error dialog box in the display unit 215 as a UI prompting the user to perform an operation to start the PC 103. FIG. 9 illustrates an example of how a communication connection error dialog box 900 is displayed. As illustrated in FIG. 9, since the external device storing the main image is being shut down, instruction information prompting the user to start the external device is displayed in the communication connection error dialog box 900.

Referring back to FIG. 8, in Step S811, the CPU 201 executes the communication control program 212 to determine whether timeout occurs. The CPU 201 determines in the first embodiment that the timeout occurs if the communication connection with the PC 103 is not established within a certain time since the start request has been submitted or since the communication connection error dialog box 900 has been displayed. If the timeout does not occur, that is, if the certain time does not elapse (NO in Step S811), the process goes to Step S812. If the timeout occurs (YES in Step S811), the process goes to Step S807. In Step S812, the CPU 201 confirms whether the communication connection with the PC 103 is established. If the communication connection with the PC 103 is established (YES in Step S812), the process goes to Step S804. If the communication connection with the PC 103 is not established (NO in Step S812), the process goes back to Step S811.

In Step S813, the CPU 201 confirms whether the main image is stored in the area identified by the address acquired in Step S801 in the tablet device 102. If the main image is stored in the area identified by the address in the tablet device 102 (YES in Step S813), the process goes to Step S814. If the main image is not stored in the area identified by the address in the tablet device 102 (NO in Step S813), the process goes to Step S807. In Step S814, the CPU 201 acquires the main image from the area identified by the address and writes the main image into the working memory 213. Then, the process goes to Step S806.

Although the case has been described above in which each adjustment item is classified into the main image adjustment item or the sub image adjustment item, one adjustment item may be divided into a parameter range adjustable with the sub image and a parameter range adjustable with the main image. Specifically, the CPU 201 may display only the parameter range that is insufficiently adjusted with the sub image and that is adjustable with the main image in the display mode indicating the unclear state in Step S604 in FIG. 6. Since the bit depth of the image data in the main image, such as the RAW image file, is generally deeper than that in the sub image, such as the JPEG image file, the main image has the advantage that tone jump caused by the image adjustment is difficult to occur. Accordingly, it is desirable that the range where the tone jump is not conspicuous is made adjustable with the sub image and the range where breakdown of the image due to the tone jump occurs is adjusted with the main image.

FIG. 10 illustrates an example of an image adjustment dialog box 1000 in this case. In the image adjustment dialog box 1000, a range 1001 in which the adjustment with the main image is desired because the range is insufficiently adjusted with the sub image and an unclear state icon 1002 associated with the range 1001 are displayed on the slider of the contrast.

The CPU 201 determines in Step S806 that the acquisition of the main image succeeded after the CPU 201 has acquired the main image in Step S805 or Step S814 in the first embodiment. However, the first embodiment is not limited to this and the CPU 201 may determine that the acquisition of the main image succeeded if it is determined in Step S804 or Step S813 that the main image is stored. In this case, the display mode of the main image adjustment items are quickly updated in Step S607 before the acquisition process of the main image in Step S805 or Step S814 is completed. Accordingly, the user is capable of advancing the operation concerning the image adjustment supposed to be applied to the main image.

As described above, the image processing system according to the first embodiment first sets the parameters of the adjustment items of the image adjustment for the main image, among the set of the main image and the sub image, and performs the image adjustment process. Before the main image corresponding to the sub image is acquired or while the main image corresponding to the sub image is being acquired, the adjustment items for the main image and the adjustment items for the sub image are displayed so as to be discriminated from each other on the screen where the adjustment items in the image adjustment are set. After the main image corresponding to the sub image is acquired, the adjustment items for the main image are displayed and the acquisition status of the main image is displayed so as to indicate whether the acquisition of the main image succeeded. Accordingly, the user is capable of quickly knowing whether the setting of the adjustment items for the main image is disabled because the main image has not been acquired or because the acquisition of the main image is disabled. Consequently, for example, in the image adjustment of the sub image before the main image is acquired, the user is capable of setting the parameters of the adjustment items with the image adjustment of the main image being supposed or with the image adjustment of only the sub image, not the main image, being supposed.

Second Embodiment

The case has been described in the first embodiment in which the tablet device 102 first holds the sub image and performs the image adjustment for the sub image and the PC 103 holds the main image and transmits the main image to the tablet device 102. However, it is sufficient for the main image and the sub image to be stored in different devices and the devices where the main image and the sub image are stored are not limited to the ones described in the first embodiment. For example, the device that stores the sub image and accepts a user's operation concerning the image adjustment may be a device other than the tablet device 102. The device that stores the main image is not limited to the PC 103 and may be the server apparatus 104 or the digital camera 101 that includes a program similar to the DRAM 505 and that is connected to the tablet device 102 or the other device via the Internet. In addition, the server apparatus 104 is constantly started up. Accordingly, when the apparatus that stores the main image is the server apparatus 104, Steps S808 to S812 in FIG. 8 are not performed.

A case in which the main image is held by the digital camera 101 will now be described in a second embodiment with reference to FIG. 11 as an exemplary case in which a device different from the device in the first embodiment holds the main image. FIG. 11 is a sequence diagram illustrating an exemplary operation of the digital camera 101, the tablet device 102, the PC 103, and the server apparatus 104 of the second embodiment. The operation described below is realized by the control units in the digital camera 101, the tablet device 102, the PC 103, and the server apparatus 104, which control the corresponding devices by executing control programs stored in the corresponding memories and the OSs and application programs stored in the memories and the storage units.

The digital camera 101 performs the image capturing, generates the main image and the sub image, associates the main image and the sub image with an image ID uniquely identifying the combination of the main image and the sub image, and records the main image and the sub image associated with the image ID in a recording medium.

Referring to FIG. 11, in Step S1101, the digital camera 101 connects to the tablet device 102 and the server apparatus 104 via short-distance wireless communication, such as Bluetooth (registered trademark) or WiFi, or wired communication, such as universal serial bus (USB), to transmit the image ID and the sub image to the respective devices. In Step S1111, the tablet device 102 connects to the server apparatus 104 via the Internet to transmit the sub image and the image ID received from the digital camera 101 to the server apparatus 104. In Step S1121, the PC 103 connects to the server apparatus 104 via the Internet to receive the sub image and the image ID from the server apparatus 104. The PC 103 is capable of acquiring the sub image and the image ID held by the digital camera 101 via the tablet device 102 and the server apparatus 104 in the above manner.

In Step S1112, the tablet device 102 performs the development to the sub image using a certain neutral parameter to generate a display sub image, displays the display sub image in the display unit, and sets the parameter for each adjustment item in response to an operation with an operation input device.

In Step S1113, upon completion of the setting of the parameter of the adjustment item for the sub image in response to the operation with the operation input device, the tablet device 102 connects to the server apparatus 104 via the Internet to transmit the image ID and the parameter of each adjustment item to the server apparatus 104. In Step S1124, the server apparatus 104 receives the image ID and the parameter of each adjustment item from the tablet device 102 and stores the image ID and the parameter of each adjustment item in the storage unit in association with each other.

In Step S1135, the PC 103 also performs the development to the sub image using a certain neutral parameter to generate the display sub image, displays the display sub image in the display unit, and sets the parameter for each adjustment item in response to an operation with the operation input device. Before the PC 103 acquires the main image or while the PC 103 is acquiring the main image, as in Step S604 described above, the main image adjustment items are displayed in the display mode indicating the unclear state and the sub image adjustment items are displayed in the display mode indicating the valid state, as illustrated in FIG. 7A. In the second embodiment, in Step S1126, the PC 103 connects to the server apparatus 104 via the Internet to receive the parameter of each adjustment item associated with the image ID. These adjustment items are also displayed in the display mode illustrated in FIG. 7A, as in Step S604 described above.

In Step S1107, the digital camera 101 connects to the PC 103 via the short-distance wireless communication, such as Bluetooth (registered trademark) or WiFi, or the wired communication, such as the USB, to transmit the main image associated with the same image ID as that of the sub image held by the PC 103 to the PC 103. The PC 103 receives the main image and stores the main image in the storage unit.

Upon acquisition of the main image corresponding to the sub image to be subjected to the image adjustment from the digital camera 101, as in Step S606 described above, the PC 103 displays the main image adjustment items in the display mode indicating the valid state, as illustrated in FIG. 7B.

In Step S1138, the PC 103 performs the development of the main image using the parameter set for each adjustment item and performs the compression in a certain format, such as JPEG, to the data resulting from the development to generate a developed image file. The PC 103 may store the developed image file in the storage unit in association with the image ID.

Third Embodiment

In a third embodiment, the tablet device 102 acquires minimum data having a data size smaller than that of the main image from the PC 103 before acquiring the main image in order to speed up the image display. The data size of the minimum data is set so as to be fitted into the size of the screen of the display unit 215 in the tablet device 102. In the third embodiment, the tablet device 102 acquires a reduced main image, which a reduced image of the main image, as the data having a data size smaller than that of the main image. The development has not been performed to the reduced main image, as in the main image. In the display of the result of the development, the development performed after the RAW image, which is the main image, is reduced so as to be fitted into the screen size in the above manner enables the speed up of the development. In contrast with the main image resulting from direct recording of the image signal output from the image pickup element in the image capturing, the reduced main image may be generated by decimating the image signal for recording. An image processing system according to the third embodiment will now be described, focusing on the points different from the image processing systems according to the first and second embodiments described above.

FIG. 12 is a diagram for describing an exemplary process of displaying the reduced main image by the tablet device 102. In the example in FIG. 12, the image display size of the tablet device 102 is set so as to be fitted into the window. A reduced development result is capable of being displayed in the display unit 215 in a size fitted into the size of an image display area: 900 pixels×600 pixels. In contrast, it is assumed in the third embodiment that the original data size of a main image 1201 stored in the PC 103 is 4.500 pixels×3,000 pixels.

Upon selection of a sub image in the tablet device 102 by the user, the PC 103 reduces the main image 1201 corresponding to the sub image selected by the user to generate a reduced main image 1202 having a size of 900 pixels×600 pixels from the main image 1201. The PC 103 transmits the reduced main image 1202 to the tablet device 102. As illustrated in FIG. 12, the reduced main image 1202 is displayed in an image display area 1210 of the display unit 215 in the tablet device 102. It is assumed in the third embodiment that the user has selected the sub image "IMG_0001.JPG." Specifically, the reduced development result of "IMG_0001.RAW" is displayed in the image display area 1210.

In addition to an image adjustment dialog box 1220, a display adjustment dialog box 1230 is displayed in the display unit 215. A zoom-in button 1231 and a zoom-out button 1232 are arranged in the display adjustment dialog box 1230. At a time when the acquisition of the reduced main image is completed and the acquisition of the main image is not completed, only the reduced main image is recorded and the corresponding main image is not recorded in the working memory 213 of the tablet device 102. Accordingly, the tablet device 102 is not capable of developing the main image for enlarged display. Consequently, the display mode of the zoom-in button 1231 is set to the unclear state and an unclear state icon 1241 is displayed in association with the zoom-in button 1231. In contrast, the tablet device 102 is capable of generating a further-reduced image from the reduced main image recorded in the working memory 213 and displaying the further-reduced image. Accordingly, the display mode of the zoom-out button 1232 is set to the valid state. Consequently, the unclear state icon is not associated with the zoom-out button 1232.

Since the tablet device 102 is capable of performing the image adjustment using the reduced main image, the display mode of each main image adjustment item in the image adjustment dialog box 1220 is set to the valid state. Accordingly, each main image adjustment item is displayed so as to be executable in the image adjustment dialog box 1220.

FIG. 13 is a flowchart illustrating an exemplary main image acquisition process in the tablet device 102 according to the third embodiment. A case will be described here in which the user has selected the sub image "IMG_0001.JPG" from the sub images displayed in the display unit 215 in the tablet device 102. Referring to FIG. 13, in Step S1301, the CPU 201 in the tablet device 102 displays a list of the sub images stored in the SSD 202 in the display unit 215 (a display process). In Step S1302, upon selection of an arbitrary sub image by the user, the CPU 201 receives a selection instruction. Here, the selection instruction is an exemplary instruction to display the reduced image of the main image corresponding to the selected sub image and Step S1302 is an example of a reception process.

In Step S1303, the CPU 201 executes the display control program 209 to display the image adjustment dialog box as an image adjustment UI. In Step S1304, the CPU 201 in the tablet device 102 displays the display adjustment dialog box. As described above with reference to FIG. 12, the display adjustment dialog box 1230 includes the zoom-in button 1231 and the zoom-out button 1232. In Step S1305, the CPU 201 sets the display modes of the main image adjustment items displayed in the image adjustment dialog box and display adjustment items displayed in the display adjustment dialog box to the unclear state. Here, the CPU 201 displays the unclear state icon in association with each main image adjustment item included in the image adjustment dialog box. In addition, the CPU 201 displays the unclear state icons in association with the zoom-in button 1231 and the zoom-out button 1232 included in the display adjustment dialog box.

In Step S1306, the CPU 201 executes the main image acquisition program 211 to execute a reduced main image acquisition process. The reduced main image acquisition process is substantially similar to the main image acquisition process described above with reference to FIG. 8 in the first embodiment. However, in the reduced main image acquisition process, the CPU 201 acquires the reduced main image, instead of the main image, in Step S805 and Step S814. In Step S1307, the CPU 201 executes the control program 208 to determine whether the acquisition of the reduced main image succeeded. If the acquisition of the reduced main image succeeded (YES in Step S1307), the process goes to Step S1308. If the acquisition of the reduced main image did not succeed (NO in Step S1307), the process goes to Step S1311.

In Step S1308, the CPU 201 displays the reduced main image in the image display area. In Step S1309, the CPU 201 executes the display control program 209 to update the display mode of the main image adjustment items in the image adjustment dialog box to the valid state. The CPU 201 causes the unclear state icon displayed in association with each main image adjustment item not to be displayed to display the main image adjustment items in the display mode indicating that the functions corresponding to the main image adjustment items are executable. In Step S1310, the CPU 201 executes the display control program 209 to update the display mode of the zoom-out button 1232 to the valid state. The CPU 201 causes the unclear state icon displayed in association with the zoom-out button 1232 not to be displayed to display the zoom-out button 1232 in the display mode allowing the user to recognize that the function (the zoom-out process) corresponding to the zoom-out button 1232 is executable. Then, the process goes to Step S1312.

In Step S1311, the CPU 201 executes the display control program 209 to update the display mode of the main image adjustment items in the image adjustment dialog box to the invalid state. The CPU 201 causes the unclear state icon displayed in association with each main image adjustment item not to be displayed. The CPU 201 displays the invalid icon indicating the invalid state in association with the main image adjustment items. Then, the process goes to Step S1312. Step S1309 and Step S1311 are the same as Step S607 and Step S608 described above with reference to FIG. 6.

In Step S1312, the CPU 201 performs the main image acquisition process. The main image acquisition process is the same as the main image acquisition process described above with reference to FIG. 8 in the first embodiment. In Step S1313, the CPU 201 executes the control program 208 to determine whether the acquisition of the main image succeeded. If the acquisition of the main image succeeded (YES in Step S1313), the process goes to Step S1314. If the acquisition of the main image did not succeed (NO in Step S1313), the process goes to Step S1315.

In Step S1314, the CPU 201 executes the display control program 209 to update the display mode of the zoom-in button 1231 to the valid state. The CPU 201 causes the unclear state icon 1241 displayed in association with the zoom-in button 1231 not to be displayed. In Step S1315, the CPU 201 executes the display control program 209 to update the display mode of the zoom-in button 1231 to the invalid state. The CPU 201 causes the unclear state icon 1241 displayed in association with the zoom-in button 1231 not to be displayed and displays the invalid icon, instead of the unclear state icon 1241. Then, the main image acquisition process illustrated in FIG. 13 is terminated.

As described above, in the image processing system according to the third embodiment, the tablet device 102 appropriately displays the icons to indicate that the main image is being acquired also for the display adjustment items for, for example, the zoom-in process and the zoom-out process to the reduced main image. This prevents the user from misunderstanding that the main image does not exit and the zoom-in display process is disabled while the main image is being acquired.

Before the main image is acquired, a partial main image, which is partial data of the main image, may be acquired as the minimum data having a data size smaller than that of the main image. In the display of the result of the development of the main image, the development performed after part of the RAW image, which is the main image, is cut out so as to be fitted into the screen size in the above manner enables the speed up of the development, as in the reduced main image.

FIG. 14 is a diagram for describing an exemplary process of displaying the partial main image by the tablet device 102. In the example in FIG. 14, the image display size of the tablet device 102 is set to 100%. A partial development result is capable of being displayed in the display unit 215 in a size fitted into an image display area: 890 pixels×890 pixels. Upon selection of a sub image in the tablet device 102 by the user, the PC 103 cuts out partial data from a main image 1401 corresponding to the sub image selected by the user to generate a partial main image 1402 having a size of 890 pixels×890 pixels. The PC 103 transmits the partial main image 1402 to the tablet device 102. As illustrated in FIG. 14, the partial main image 1402 is displayed in an image display area 1410 of the display unit 215 in the tablet device 102. It is assumed in the third embodiment that the user has selected the sub image "IMG_0001.JPG." Specifically, the partial development result of "IMG_0001.RAW" is displayed in the image display area 1410.

In addition to an image adjustment dialog box 1420, a display adjustment dialog box 1430 is displayed in the display unit 215. A zoom-in button 1431, a zoom-out button 1432, and sliders 1433a and 1433b are arranged in the display adjustment dialog box 1430. The tablet device 102 does not set the image display size to a size greater than 100%. Accordingly, the display mode of the zoom-in button is set to the invalid state and an invalid icon 1451 is displayed in association with the zoom-in button 1431 regardless of the acquisition status of the main image. The main image composed of the pixels around the partial main image is used to display the reduced image. However, at a time when the acquisition of the partial main image is completed and the acquisition of the main image is not completed, only the partial main image is recorded and the corresponding main image is not recorded in the working memory 213 of the tablet device 102. Accordingly, the display mode of the zoom-out button 1432 is set to the unclear state and an unclear state icon 1441 is displayed in association with the zoom-out button 1432.

In addition, since only the partial main image is recorded and the corresponding main image is not recorded in the working memory 213 of the tablet device 102, the tablet device 102 is not capable of displaying other image areas in response to slider operations. Accordingly, the display mode of the sliders 1433a and 1433b is set to the unclear state and unclear state icons 1442a and 1442b are displayed in association with the sliders 1433a and 1433b, respectively.

FIG. 15 is a flowchart illustrating an exemplary main image acquisition process using the partial main image, instead of the reduced main image. A case will be described here in which the user has selected the sub image "IMG_0001.JPG" from the sub images displayed in the display unit 215 in the tablet device 102. Referring to FIG. 15, in Step S1501, the CPU 201 in the tablet device 102 displays a list of the sub images stored in the SSD 202 in the display unit 215. In Step S1502, upon selection of an arbitrary sub image by the user, the CPU 201 receives a selection instruction.

In Step S1503, the CPU 201 executes the display control program 209 to display the image adjustment dialog box as an image adjustment UI. In Step S1504, the CPU 201 in the tablet device 102 displays the display adjustment dialog box. As described above with reference to FIG. 14, the display adjustment dialog box 1430 includes the zoom-in button 1431, the zoom-out button 1432, and the sliders 1433a and 1433b. In Step S1505, the CPU 201 sets the display mode of the main image adjustment items displayed in the image adjustment dialog box to the unclear state. In addition, the CPU 201 sets the display modes of the zoom-out button 1432 and the sliders 1433a and 1433b, among the display adjustment items displayed in the display adjustment dialog box, to the unclear state. Here, the CPU 201 displays the unclear state icon in association with each main image adjustment item included in the image adjustment dialog box. In addition, the CPU 201 displays the unclear state icons 1441, 1442a, and 1422b in association with the zoom-out button 1432 and the sliders 1433a and 1433b, respectively, included in the display adjustment dialog box. In Step S1506, the CPU 201 sets the display mode of the zoom-in button 1431 to the invalid state. The CPU 201 displays the invalid icon 1451 in association with the zoom-in button 1431.

In Step S1507, the CPU 201 executes the main image acquisition program 211 to execute a partial main image acquisition process. The partial main image acquisition process in Step S1507 is substantially similar to the main image acquisition process described above. However, in the partial main image acquisition process, the CPU 201 acquires the partial main image, instead of the main image, in Step S805 and Step S814. In Step S1508, the CPU 201 executes the control program 208 to determine whether the acquisition of the partial main image succeeded. If the acquisition of the partial main image succeeded (YES in Step S1508), the process goes to Step S1509. If the acquisition of the partial main image did not succeed (NO in Step S1508), the process goes to Step S1511.

In Step S1509, the CPU 201 displays the partial main image in the image display area. In Step S1510, the CPU 201 executes the display control program 209 to update the display mode of the main image adjustment items in the image adjustment dialog box to the valid state. The CPU 201 causes the unclear state icon displayed in association with each main image adjustment item not to be displayed to display the zoom-out button 1232 in the display mode indicating that the function (the zoom-out process) of the zoom-out button 1232 is executable. Then, the process goes to Step S1512. In Step S1511, the CPU 201 executes the display control program 209 to update the display mode of the main image adjustment items in the image adjustment dialog box to the invalid state. The CPU 201 causes the unclear state icon displayed in association with each main image adjustment items not to be displayed. The CPU 201 displays the invalid icon indicating the invalid state in association with each main image adjustment item. Then, the process goes to Step S1512.

In Step S1512, the CPU 201 performs the main image acquisition process. The main image acquisition process is the same as the main image acquisition process described above. In Step S1513, the CPU 201 executes the control program 208 to determine whether the acquisition of the main image succeeded. If the acquisition of the main image succeeded (YES in Step S1513), the process goes to Step S1514. If the acquisition of the main image did not succeed (NO in Step S1513), the process goes to Step S1515.

In Step S1514, the CPU 201 executes the display control program 209 to update the display modes of the zoom-out button 1432 and the sliders 1433a and 1433b to the valid state. The CPU 201 causes the unclear state icons 1441, 1442a, and 1442b displayed in association with the zoom-out button 1432 and the sliders 1433a and 1433b, respectively not to be displayed. In Step S1515, the CPU 201 executes the display control program 209 to update the display modes of the zoom-out button 1432 and the sliders 1433a and 1433b to the invalid state. The CPU 201 causes the unclear state icons 1441, 1442a, and 1442b displayed in association with the zoom-out button 1432 and the sliders 1433a and 1433b, respectively, not to be displayed and displays the invalid icons, instead of the unclear state icons 1441, 1442a, and 1442b. Then, the main image acquisition process illustrated in FIG. 15 is terminated.

As described above, the tablet device 102 according to the third embodiment appropriately displays the icons to indicate that the main image is being acquired also for the display adjustment items for, for example, the zoom-out process and the change of the display area to the partial main image displayed in the display unit 215. This prevents the user from misunderstanding that the main image does not exit and the display adjustment is disabled while the main image is being acquired.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Part of the above embodiments may be appropriately combined.

This application claims the benefit of Japanese Patent Application No. 2014-158779, filed Aug. 4, 2014 and No. 2015-143387 filed Jul. 17, 2015, which are hereby incorporated by reference herein in their entirety.

The invention claimed is:

1. An information processing apparatus comprising:
an adjusting unit configured to perform an adjustment process to a first image, in a set of the first image generated by performing a certain process to an image signal output from an image pickup element and a second image generated by not performing the certain process;
a setting unit configured to set a parameter used in the adjustment process to the first image or the second image for each adjustment item;
an acquiring unit configured to, after the setting unit starts to set the parameter used in the adjustment process to the first image, acquire the second image; and
a display unit configured to display a plurality of adjustment items set by the setting unit on a screen and update a display mode of at least one certain adjustment item, among the plurality of adjustment items, depending on an acquisition status of the second image by the acquiring unit to display the certain adjustment item in the updated display mode.

2. The information processing apparatus according to claim 1, wherein, when the acquiring unit is capable of acquiring the second image or when the acquiring unit is not capable of acquiring the second image, the display unit updates the display mode of the certain adjustment item to display the certain adjustment item in the updated display mode.

3. The information processing apparatus according to claim 1, wherein the display unit displays an adjustment item adjustable with the first image and an adjustment item adjustable with the second image in a display mode in which the adjustment item adjustable with the first image and the adjustment item adjustable with the second image are discriminated from each other depending on whether the acquiring unit is capable of acquiring the second image.

4. The information processing apparatus according to claim 1, wherein the display unit displays a parameter range adjustable with the first image and a parameter range adjustable with the second image for the certain adjustment item in a display mode in which the parameter range adjustable with the first image and the parameter range adjustable with the second image are discriminated from each other depending on whether the acquiring unit is capable of acquiring the second image.

5. The information processing apparatus according to claim 1, wherein, if the second image is acquired by the acquiring unit, the adjusting unit performs the adjustment process to the second image, instead of the first image, using the parameter set by the setting unit.

6. The information processing apparatus according to claim 1, wherein, upon acquisition of the second image by the acquiring unit and reception of an operation for the certain adjustment item displayed on the screen by the display unit, the adjusting unit performs the adjustment process to the second image, instead of the first image.

7. The information processing apparatus according to claim 1, wherein the acquiring unit acquires the second image using a communication method different from that of the first image.

8. The information processing apparatus according to claim 1, wherein the first image and the second image are generated by performing different compression processes to data acquired through image capturing by an image pickup apparatus.

9. The information processing apparatus according to claim 1, wherein the certain process is development.

10. An information processing method comprising:
performing an adjustment process to a first image, in a set of the first image generated by performing a certain process to an image signal output from an image pickup element and a second image generated by not performing the certain process:
setting a parameter used in the adjustment process to the first image or the second image for each adjustment item;
acquiring, after the setting of the parameter used in the adjustment process to the first image is started, the second image; and
displaying a plurality of adjustment items that are set on a screen and updating a display mode of at least one certain adjustment item, among the plurality of adjustment items, depending on an acquisition status of the second image to display the certain adjustment item in the updated display mode.

11. A non-transitory computer-readable recording medium storing a program that causes a computer to perform:
performing an adjustment process to a first image, in a set of the first image generated by performing a certain process to an image signal output from an image pickup element and a second image generated by not performing the certain process;
setting a parameter used in the adjustment process to the first image or the second image for each adjustment item;
acquiring, after the setting of the parameter used in the adjustment process to the first image is started, the second image; and
displaying a plurality of adjustment items that are set on a screen and updating a display mode of at least one certain adjustment item, among the plurality of adjustment items, depending on an acquisition status of the second image to display the certain adjustment item in the updated display mode.

12. The information processing apparatus according to claim 1, further comprising:
a requesting unit configured to submit a start request to the external device, if a communication connection between the external apparatus and the information processing apparatus is not established.

13. The information processing apparatus according to claim 1,
wherein, before or after the acquiring unit succeeds in acquiring the second image, the display unit updates the display mode of the certain adjustment item to display the certain adjustment item in the updated display mode.

14. The information processing apparatus according to claim 1,
wherein, before or after the acquiring unit fails in acquiring the second image, the display unit updates the display mode of the certain adjustment item to display the certain adjustment item in the updated display mode.

15. The information processing apparatus according to claim 2,
wherein the acquiring unit configured to, after the setting unit starts to set the parameter used in the adjustment process to the first image, acquire the second image from a storage area of the information processing apparatus, if the second image exists in the storage area of the information processing apparatus; and the display unit updates the display mode of the certain adjustment item to display the certain adjustment item in the same updated display mode as the acquiring unit succeeds in acquiring the second image from the external apparatus.

16. The information processing apparatus according to claim 1, wherein the display modes are corresponding to at least one of an unclear state, a valid state and an invalid state, which are the acquisition statuses of the second image respectively.

17. The information processing apparatus according to claim 1, wherein the plurality of adjustment items are corresponding to at least one of brightness adjustment, contrast adjustment, sharpness adjustment, color density adjustment, noise reduction, white balance adjustment and zoom adjustment.

* * * * *